(12) United States Patent
Shi et al.

(10) Patent No.: US 12,159,154 B2
(45) Date of Patent: Dec. 3, 2024

(54) MEMORY MANAGEMENT METHOD AND APPARATUS

(71) Applicant: HUAWEI TECHNOLOGIES CO., LTD., Guangdong (CN)

(72) Inventors: Hui Shi, Shenzhen (CN); Yang Ding, Shenzhen (CN); Kui Zhang, Wuhan (CN); Chengyuan Wang, Shenzhen (CN); Chao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 587 days.

(21) Appl. No.: 17/483,953

(22) Filed: Sep. 24, 2021

(65) Prior Publication Data

US 2022/0012085 A1     Jan. 13, 2022

Related U.S. Application Data

(63) Continuation of application No. PCT/CN2020/072325, filed on Jan. 15, 2020.

(30) Foreign Application Priority Data

Mar. 25, 2019    (CN) .......................... 201910229665.2

(51) Int. Cl.
     *G06F 9/455*      (2018.01)
     *G06F 9/50*      (2006.01)
     *G06F 12/02*      (2006.01)

(52) U.S. Cl.
     CPC ........ *G06F 9/45558* (2013.01); *G06F 9/5016* (2013.01); *G06F 9/5022* (2013.01);
(Continued)

(58) Field of Classification Search
None
See application file for complete search history.

(56) References Cited

U.S. PATENT DOCUMENTS

| 8,060,543 B1 | 11/2011 | Ciot |
| 2002/0087590 A1 | 7/2002 | Bacon et al. |

(Continued)

FOREIGN PATENT DOCUMENTS

| CN | 102929699 A | 2/2013 |
| CN | 103226476 A | 7/2013 |
| CN | 108804337 A | 11/2018 |

OTHER PUBLICATIONS

Browning, "Object Management", Apress (Year: 2019).*

(Continued)

*Primary Examiner* — Wynuel S Aquino

(57) ABSTRACT

The technology of this application relates to a memory management method and apparatus. When garbage collection is performed by using the method, stored information about a first reference cycle is first obtained, where the first reference cycle is a cyclic reference formed by a plurality of objects, and the information about the first reference cycle includes the plurality of objects in the first reference cycle and a reference relationship between the plurality of objects. The method further includes determining that a second reference cycle exists, where information about the second reference cycle matches the information about the first reference cycle, and the information about the second reference cycle includes a plurality of objects in the second reference cycle and a reference relationship between the plurality of objects. The method further includes reclaiming memory occupied by the plurality of objects in the second reference cycle.

20 Claims, 13 Drawing Sheets

(52) U.S. Cl.
CPC ...... *G06F 12/0238* (2013.01); *G06F 12/0253* (2013.01); *G06F 2009/45583* (2013.01)

(56) References Cited

U.S. PATENT DOCUMENTS

| | | | | |
|---|---|---|---|---|
| 2002/0107880 A1* | 8/2002 | Bacon | ................ | G06F 12/0261 |
| 2008/0270482 A1* | 10/2008 | Hillberg | .............. | G06F 12/0253 |
| 2018/0121178 A1* | 5/2018 | Distefano | ............. | G06F 8/4435 |

OTHER PUBLICATIONS

International Search Report and Written Opinion issued in PCT/CN2020/072325, dated Apr. 14, 2020, 10 pages.
European Search Report for Application No. 20779864.6, dated Apr. 5, 2022, 9 pages.

\* cited by examiner

```
class A{
  B b;
}
class B{
  C c;
}class C{
  A a;
}
Public class Test{
 Public static void main (String[] args){
    A a=new A();
    B b=new B();
    C c=new C();
    a.b=b;
    b.c=c;
    c.a=a;
 }
}
```

```
class A:
  def __init__(self,b):
    self.b=b class B:
  def __init__(self,c):
    self.c=c classC:
  def __init__(self,a):
    self.a=a
```

MEMORY MANAGEMENT METHOD AND APPARATUS

CROSS-REFERENCE TO RELATED APPLICATIONS

This application is a continuation of International Application No. PCT/CN2020/072325, filed on Jan. 15, 2020, which claims priority to Chinese Patent Application No. 201910229665.2, filed on Mar. 25, 2019. The disclosures of the aforementioned applications are hereby incorporated by reference in their entireties.

TECHNICAL FIELD

This application relates to the field of computer technologies, and in particular, to a memory management method and apparatus and the like.

BACKGROUND

Garbage collection is a mechanism used to automatically manage memory of a computer in a computer technology. A main idea of garbage collection is as follows: when an application program runs on a computer, one object may reference another object (the object may also be referred to as an internal storage object or node) in the application program, and each object occupies memory of the computer. If an object is no longer required, in other words, the object is not referenced by any other object, the object should be released, so that memory occupied by the object can be used by another object, and a memory resource is automatically reclaimed.

Currently, a common technical solution used to implement garbage collection is a reference counting (RC) algorithm. The RC algorithm maintains one reference counting value for each object. When an object 1 references an object 2 in an application program, a reference counting value of the object 2 is increased by 1. When the object 1 no longer references the object 2, the reference counting value of the object 2 is decreased by 1. When the reference counting value of the object 2 is 0, memory occupied by the object 2 is reclaimed by a memory distributor.

However, a reference cycle may exist in an application program implemented in an object-oriented programming language. In FIG. 1, an object A references an object B, the object B references an object C, and the object C references the object A. Therefore, the object A, the object B, and the object C form a reference cycle. In the reference cycle shown in FIG. 1, the objects reference each other. Therefore, a minimum reference counting value of each object in the reference cycle is 1, and cannot be changed to 0. Consequently, a memory resource occupied by each object in the reference cycle cannot be reclaimed, causing a memory resource waste.

SUMMARY

Embodiments of this application provide a memory management method and apparatus, to reclaim a memory resource occupied by an object in a reference cycle.

According to a first aspect, this application provides a memory management method. In the method, stored information about a first reference cycle is first obtained. The first reference cycle is a cyclic reference formed by a plurality of objects, and the information about the first reference cycle includes the plurality of objects in the first reference cycle and a reference relationship between the plurality of objects. A reference cycle may also be referred to as a cyclic reference, and may be used to indicate a cyclic reference of a plurality of objects. For example, if an object A references an object B, the object B references an object C, and the object C references the object A, the three objects A, B, and C form a cyclic reference. A reference cycle may be used to describe the cyclic reference formed by the three objects. Alternatively, if an object A references an object B, and the object B references the object A, the object A and the object B form a cyclic reference. The first reference cycle is a reference cycle in which an external reference does not exist, and the external reference indicates that an object other than the objects in the first reference cycle references any object in the first reference cycle.

Then, if it is determined that a second reference cycle exists, and information about the second reference cycle matches the information about the first reference cycle, where the information about the second reference cycle includes a plurality of objects in the second reference cycle and a reference relationship between the plurality of objects, memory occupied by the plurality of objects in the second reference cycle is reclaimed. For example, if an object A references an object B, the object B may be referred to as an object directly referenced by the object A; if an object A references an object B, and the object B references an object C, the object C may be referred to as an object indirectly referenced by the object A, and the object B may be referred to as an intermediate object. There may be at least one intermediate object between two objects in an indirect reference relationship. For example, if an object A references an object B, the object B references an object C, and the object C references an object D, the object D may also be referred to as an object indirectly referenced by the object A. The plurality of objects in the second reference cycle may be a plurality of objects including a first object and one or more second objects described below.

In the foregoing technical solution, if matching is performed between the first reference cycle and the second reference cycle to determine that a plurality of objects form the second reference cycle, memory resources of the objects in the second reference cycle are reclaimed, so that the reference cycle is reclaimed, and a problem of a memory resource waste caused when a reference cycle cannot be reclaimed can be avoided.

In a possible implementation, the information about the first reference cycle further includes a reference counting value, in the first reference cycle, of each object in the first reference cycle, and the information about the second reference cycle further includes a reference counting value, in the second reference cycle, of each object in the second reference cycle; and that information about the second reference cycle matches the information about the first reference cycle includes that the plurality of objects in the second reference cycle are in a one-to-one correspondence with the plurality of objects in the first reference cycle and the reference counting value of each object in the second reference cycle is equal to a reference counting value of a corresponding object in the first reference cycle.

In a possible implementation, the information about the first reference cycle includes an identifier of a referenced object, and the identifier of the referenced object is a storage address of the referenced object, an offset of a storage address of the referenced object relative to a storage address of a referencing object of the referenced object, or a name of the referenced object. For example, if the first reference cycle includes that an object A references an object B, the object B is a referenced object, and the object A is a referencing object of the referenced object.

In a possible implementation, it is determined, based on the information about the first reference cycle, information about the first object, and information about each of the one or more second objects, that a reference cycle formed by the first object and the one or more second objects is the same as the first reference cycle, where the information about the first object is used to describe a reference relationship of the first object, and the information about each second object is used to describe a reference relationship of the second object.

In the foregoing technical solution, after the information about the first reference cycle is obtained, information that is about the first object and that is used to describe a reference relationship between the first object and another object and the information that is of each second object and that is used to describe a reference relationship between the second object and another object may be further obtained. For example, if an object A references an object B, information about the object A may record a reference relationship that the object A references the object B. Therefore, it may be determined, based on the information about the first reference cycle, the information about the first object, and the information about each second object, whether a reference cycle formed by the first object and each second object that has a direct or indirect reference relationship with the first object is the same as the first reference cycle.

In a possible implementation, if the information about the first reference cycle includes a reference relationship of each of the plurality of objects and a reference counting value of each object in the first reference cycle, the information about the first object includes a reference counting value of the first object, where the reference counting value of the first object herein is a current reference counting value of the first object, and the information about each second object includes a reference counting value of the second object, it may be determined, based on the information about the first reference cycle, the information about the first object, and the information about each of the one or more second objects, that the reference relationship between the plurality of objects in the first reference cycle is the same as a reference relationship between the first object and the one or more second objects and that a reference counting value of a third object in the plurality of objects in the first reference cycle is the same as that of an object that is in the first object and the one or more second objects and that corresponds to the third object, where the third object is any one of the plurality of objects in the first reference cycle, and the plurality of objects in the first reference cycle are in a one-to-one correspondence with the plurality of objects including the first object and the one or more second objects.

In the foregoing technical solution, each object may be referenced by different objects, for example, may be referenced by objects that can form a cyclic reference, or may be referenced by objects that cannot form a cyclic reference. For example, an object A, an object B, and an object C can form a cyclic reference, and the object A is further used by an object D. If the information about the first reference cycle is that the object A references the object B, the object B references the object C, the object C references the object A, because the information about the first reference cycle does not include the object D, it may be determined, by using information about the object A to the object C, that a reference cycle formed by the object A to the object C is the same as the first reference cycle. However, actually, because the reference cycle formed by the object A to the object C is further used by the object D, the reference cycle formed by the object A to the object C cannot be reclaimed. In other words, a reference cycle can be reclaimed only when objects in the reference cycle are not referenced by an object outside the reference cycle. Therefore, to improve accuracy of reclaiming a reference cycle by using the memory management method in this application, the information about the first reference cycle, the information about the first object, and the information about each second object may further include a reference counting value of each object. In this way, when a reference relationship between the first object and at least one second object and the reference counting value of each object are the same as corresponding content in the information about the first reference cycle, a reference cycle formed by the first object and the at least one second object can be reclaimed.

In this embodiment of this application, a reference relationship between a plurality of objects may be understood as a plurality of directed paths formed by reference relationships of the plurality of objects, or may be understood as a directed path formed from a start object in the plurality of objects to each object other than the start object in the plurality of objects and then back to the start object, where the start object may be any one of the plurality of objects. Therefore, that the reference relationship between the plurality of objects in the first reference cycle is the same as the reference relationship between the first object and the one or more second objects may mean that a first directed path formed between the plurality of objects in the first reference cycle is the same as a second directed path formed between the first object and the one or more second objects, or a directed path formed from a start object in the plurality of objects in the first reference cycle to each object other than the start object in the plurality of objects and then back to the start object is the same as a directed path formed from a start object in the first object and the one or more second objects to each object other than the start object in the plurality of objects and then back to the start object.

That the plurality of objects in the first reference cycle are in a one-to-one correspondence with the plurality of objects including the first object and the one or more second objects may mean that based on the reference relationship, the plurality of objects in the first reference cycle are in a one-to-one correspondence with the plurality of objects including the first object and the one or more second objects, and based on the reference relationship, an object in the first reference cycle and a corresponding object in the first object and the at least one second object should be a same object.

In a possible implementation, the information about the first reference cycle includes an identifier of the third object and an identifier of an object referenced by the third object.

Because a relatively large quantity of objects may form the first reference cycle, to simplify the information about the first reference cycle and reduce memory occupied by the first reference cycle, a reference relationship between all objects may be indicated by using an identifier of each object and an identifier of an object referenced by each object.

In a possible implementation, the identifier of the object referenced by the third object is a storage address of the object referenced by the third object, an offset of a storage address of the object referenced by the third object relative to a storage address of the third object, or a name of the object referenced by the third object.

In the foregoing technical solution, each object in the first reference cycle may be indicated in a plurality of manners, so that flexibility of the memory management method in this application can be improved.

In a possible implementation, if the first object is a start object of the first reference cycle, the plurality of objects in the first reference cycle include the start object and an end object of the start object, and the start object indirectly references the end object by using one or more intermediate objects, the information about the first reference cycle may include:

information about the start object, where the information about the start object includes a reference relationship used to indicate that the start object references an object referenced by the start object and a reference counting value of the start object, and the reference counting value of the start object is used to indicate a quantity of times the start object is referenced by an object other than the start object in the first reference cycle;

information about the one or more intermediate objects, where information about each intermediate object includes a reference relationship used to indicate that the intermediate object references another intermediate object and a reference counting value of the intermediate object, and the reference counting value of the intermediate object is used to indicate a quantity of times the intermediate object is referenced by an object other than the intermediate object in the first reference cycle; and information about the end object, where the end object includes an object referencing the start object in the first reference cycle, the information about the end object includes a reference relationship used to indicate that the end object references the start object and a reference counting value of the end object, and the reference counting value of the end object is used to indicate a quantity of times the end object is referenced by an object other than the end object in the first reference cycle.

In a possible implementation, if the first object is a start object of the first reference cycle, the plurality of objects in the first reference cycle include the start object and an end object, and the start object directly references the end object, the information about the first reference cycle includes:

information about the start object, where the information about the start object includes a reference relationship used to indicate that the start object references the end object and a reference counting value of the start object, and the reference counting value of the start object is used to indicate a quantity of times the start object is referenced by an object other than the start object in the first reference cycle; and information about the end object, where the end object includes an object referencing the start object in the first reference cycle, the information about the end object includes a reference relationship used to indicate that the end object references the start object and a reference counting value of the end object, and the reference counting value of the end object is used to indicate a quantity of times the end object is referenced by an object other than the end object in the first reference cycle.

In a possible implementation, the information about the first reference cycle is stored in metadata of a first object, the first object is a last object that is in the plurality of objects in the first reference cycle and that is released by an external object, and the external object is an object, other than the plurality of objects in the first reference cycle, that references the first object. The metadata is data used to describe data. Specifically, the metadata is used to describe a name of the first object, a class of a data structure of the first object, and a storage location of the first object.

Because the first reference cycle may include a plurality of objects, information about a corresponding reference cycle may be generated for each object in the first reference cycle. For example, information about a corresponding reference cycle is generated by using each object in the first reference cycle as a start object. However, to reduce memory occupied by the information about the first reference cycle, the information about the first reference cycle may be generated by selecting one or some of the plurality of objects included in the first reference cycle. In addition, the information about the first reference cycle may be stored in metadata of the one or some objects, or a storage unit dedicated to storing the information about the first reference cycle may be allocated, and this is not limited herein.

In a possible implementation, before the stored information about the first reference cycle is obtained, the memory management method further includes: obtaining a plurality of objects generated in a running process of an application program, where any one of the plurality of objects is an object whose reference counting value is greater than 0; determining a reference relationship between the plurality of objects based on information about each of the plurality of objects, where the information about each object includes an identifier of an object referenced by each object; and generating and storing the information about the first reference cycle based on the reference relationship between the plurality of objects. Specifically, the identifier of the object referenced by each object may be a name of the object or a storage address of the object.

In a possible implementation, the method includes: determining that a reference counting value of any object is less than or equal to a first threshold, and triggering the step of obtaining stored information about a first reference cycle, where the any object is included in the first reference cycle.

In a possible implementation, before the memory management method in this embodiment of this application is performed, a plurality of fourth objects whose reference counting values are greater than 0 in the application program in the running process are first obtained, a reference relationship between the plurality of fourth objects is determined based on information about each of the plurality of fourth objects, where the information about the fourth object includes a reference counting value of the fourth object and an identifier of an object referenced by the fourth object, so that information about at least one second reference cycle is generated based on the reference relationship between the plurality of fourth objects, where information about each second reference cycle is used to describe a reference relationship between a plurality of objects forming the second reference cycle, and the at least one second reference cycle includes the first reference cycle, and finally the first reference cycle is stored in the metadata of the first object.

The information about the first reference cycle may be prestored, so that the information about the first reference cycle can be loaded when the application program starts. Alternatively, in the foregoing technical solution, in the running process of the application program, the information about the reference cycle may be collected by selecting an occasion based on a running status of a service process. For example, the information may be obtained through self-learning when a computing device is in an idle state. The memory management method may be dynamically adjusted.

In a possible implementation, the first reference cycle is a cyclic reference formed in a running process of one application program.

In the foregoing technical solution, information that is about a reference cycle and that is obtained from each application program may not be shared. Therefore, memory management methods of the application programs may be independent of each other, and even if a fault occurs when an application program performs the memory management method, another application program is not affected. In addition, the memory management method in this embodiment of this application is performed in a single service thread of an application program. Therefore, in the memory management method, running of all service threads of the application program does not need to be suspended (that is, stop the world (STW)).

In a possible implementation, the reference counting value of the first object may be first obtained, and after it is determined that the reference counting value of the first object is the same as the first threshold, the memory management method in this embodiment of this application is performed. The first threshold is a reference counting value of a start object in the first reference cycle; or the first object is associated with information about a plurality of reference cycles, the first threshold is a maximum value of reference counting values of a plurality of start objects, and the plurality of start objects are in a one-to-one correspondence with the plurality of reference cycles. The start object is a last object that is in the plurality of objects in the first reference cycle and that is released by an external object.

In this way, the memory management method in this embodiment of this application is performed only after a specific condition is met, so that cases of performing the memory management method when no reference cycle needs to be reclaimed are reduced, a quantity of times of performing the memory management method can be reduced, and load of a computing device can be reduced.

In a possible implementation, the method further includes: obtaining a hit count of each reference cycle in the first reference cycle, where the hit count is used to indicate a quantity of times of reclaiming memory occupied by the plurality of objects in the second reference cycle; determining a hit rate of each of a plurality of reference cycles, where the hit rate is a ratio of the hit count to a quantity of times of performing the memory management method; and deleting information about the first reference cycle whose hit rate is less than a preset ratio or setting a status of the information about the first reference cycle whose hit rate is less than the preset ratio to an invalid state.

In a possible implementation, the first object may be associated with a plurality of reference cycles, in other words, a plurality of different reference cycles may be formed by the first object and different second objects. For a plurality of reference cycles, a hit count of each of the plurality of reference cycles and a quantity of times of performing matching by using information about each reference cycle may be obtained. The hit count is used to indicate a quantity of times of reclaiming an object in the reference cycle based on the information about the reference cycle. If a hit rate of each of the plurality of reference cycles is determined, where the hit rate is a ratio of the hit count to a quantity of times of performing the memory management method, information about a reference cycle whose hit rate is less than a preset ratio is deleted, or a status of information about a reference cycle whose hit rate is less than the preset ratio is set to an invalid state.

In the foregoing technical solution, if the computing device is executing a task with a relatively large calculation amount, information about a reference cycle with an excessively low hit rate and on which frequent matching is performed causes greater calculation pressure to the computing device. Therefore, the foregoing function may be performed to delete information about a reference cycle whose hit rate is less than a specific threshold or set information about a reference cycle whose hit rate is less than the specific threshold to be in an invalid state, so that efficiency of reclaiming a reference cycle can be increased.

In a possible implementation, after the setting a status of the information about the first reference cycle whose hit rate is less than the preset ratio to an invalid state, the method further includes:
determining that a quantity of unreclaimed objects is greater than a second threshold, where reference counting values of the unreclaimed objects are greater than 0; and
restoring the status of the information about the first reference cycle in the invalid state to a valid state.

In a possible implementation, after the status of the information about the reference cycle whose hit rate is less than the preset ratio is set to the invalid state, if it is determined, after resources occupied by the first object and the one or more second objects are reclaimed, that a quantity of fifth objects whose occupied resources are unreclaimed is greater than a second threshold, where reference counting values of the fifth objects are greater than 0, the status of the information about the reference cycle in the invalid state may be restored to a valid state.

When an application program is in different scenarios, for example, a start scenario and a plug-in installation scenario, reference cycles formed may be different. Therefore, when there are a relatively large quantity of unreclaimed objects in the application program, it indicates that information about a reference cycle in a valid state in the application program is not applicable to the scenario. Therefore, information about a reference cycle that is previously set to be in the invalid state may be set to be in the valid state, so that effectiveness of the memory management method can be improved.

According to a second aspect, a memory management apparatus is provided. The memory management apparatus may be a terminal device, or may be an apparatus in a terminal device. The memory management apparatus includes a processor, configured to implement the method described in the first aspect. The memory management apparatus may further include a storage, configured to store program instructions and data. The storage is coupled to the processor, and the processor may invoke and execute the program instructions stored in the storage, to implement functions in any implementation in the method described in the first aspect. The memory management apparatus may further include a communications interface, and the communications interface is used by the memory management apparatus to communicate with another device. For example, the another device is another terminal or a server.

In a possible implementation, the memory management apparatus includes a processor and a communications interface; and
the processor obtains stored information about a first reference cycle by using the communications interface, where the first reference cycle is a cyclic reference formed by a plurality of objects, and the information about the first reference cycle includes the plurality of objects in the first reference cycle and a reference relationship between the plurality of objects; determines that a second reference cycle exists, where information about the second reference cycle matches the information about the first reference cycle, and the information about the second reference cycle includes a plurality of objects in the second reference cycle and a reference relationship between the plurality of objects; and reclaims memory occupied by the plurality of objects in the second reference cycle.

In a possible implementation, the processor determines, based on the information about the first reference cycle, information about a first object, and information about each of one or more second objects, that a reference cycle formed by the first object and the one or more second objects is the same as the first reference cycle, where the information about the first object is used to describe a reference relationship of the first object, and the information about each second object is used to describe a reference relationship of the second object.

In a possible implementation, the information about the first reference cycle further includes a reference counting value, in the first reference cycle, of each object in the first reference cycle, and the information about the second reference cycle further includes a reference counting value, in the second reference cycle, of each object in the second reference cycle; and that information about the second reference cycle matches the information about the first reference cycle includes that the plurality of objects in the second reference cycle are in a one-to-one correspondence with the plurality of objects in the first reference cycle and the reference counting value of each object in the second reference cycle is equal to a reference counting value of a corresponding object in the first reference cycle.

In a possible implementation, the information about the first reference cycle includes an identifier of a referenced object, and the identifier of the referenced object is a storage address of the referenced object, an offset of a storage address of the referenced object relative to a storage address of a referencing object of the referenced object, or a name of the referenced object.

In a possible implementation, the information about the first reference cycle is stored in metadata of the first object, the first object is a last object that is in the plurality of objects in the first reference cycle and that is released by an external object, and the external object is an object, other than the plurality of objects in the first reference cycle, that references the first object.

In a possible implementation, the processor is further configured to: obtain a plurality of objects generated in a running process of an application program, where any one of the plurality of objects is an object whose reference counting value is greater than 0; determine a reference relationship between the plurality of objects based on information about each of the plurality of objects, where the information about each object includes an identifier of an object referenced by each object; and generate and store the information about the first reference cycle based on the reference relationship between the plurality of objects.

In a possible implementation, the processor is further configured to: determine that a reference counting value of any object is less than or equal to a first threshold, and trigger the step of obtaining stored information about a first reference cycle, where the any object is included in the first reference cycle.

In a possible implementation, the any object is a last object that is in the plurality of objects in the first reference cycle and that is released by an external object, and the external object is an object, other than the plurality of objects in the first reference cycle, that references the first object.

In a possible implementation, the processor is further configured to: obtain a hit count of each reference cycle in the first reference cycle, where the hit count is used to indicate a quantity of times of reclaiming memory occupied by the plurality of objects in the second reference cycle; determining a hit rate of each of a plurality of reference cycles, where the hit rate is a ratio of the hit count to a quantity of times of performing a memory management method; and delete information about the first reference cycle whose hit rate is less than a preset ratio or set a status of the information about the first reference cycle whose hit rate is less than the preset ratio to an invalid state.

In a possible implementation, the processor is further configured to: determine that a quantity of unreclaimed objects is greater than a second threshold, where reference counting values of the unreclaimed objects are greater than 0; and restore the status about the information of the first reference cycle in the invalid state to a valid state.

In a possible implementation, the information about the first reference cycle includes a reference relationship of each of the plurality of objects and a reference counting value of each object in the first reference cycle, the information about the first object includes a reference counting value of the first object, the information about each second object includes a reference counting value of the second object, and the processor determines that the reference relationship between the plurality of objects in the first reference cycle is the same as a reference relationship between the first object and the one or more second objects and that a reference counting value of a third object in the plurality of objects in the first reference cycle is the same as that of an object that is in the first object and the one or more second objects and that corresponds to the third object, where the third object is any one of the plurality of objects in the first reference cycle, and the plurality of objects in the first reference cycle are in a one-to-one correspondence with a plurality of objects including the first object and the one or more second objects.

In a possible implementation, the information about the first reference cycle includes an identifier of the third object and an identifier of an object referenced by the third object.

In a possible implementation, the identifier of the object referenced by the third object is a storage address of the object referenced by the third object, an offset of a storage address of the object referenced by the third object relative to a storage address of the third object, or a name of the object referenced by the third object.

In a possible implementation, the information about the first reference cycle is stored in metadata of the first object, the first object is a last object that is in the plurality of objects in the first reference cycle and that is released by an external object, the external object is an object, other than the plurality of objects in the first reference cycle, that references the first object, and the metadata is used to describe a name of the first object, a class of a data structure of the first object, and a storage location of the first object.

In a possible implementation, the processor obtains a plurality of fourth objects of the application program in the running process by using the communications interface, where any one of the plurality of fourth objects is an object whose reference counting value is greater than 0; and the processor determines a reference relationship between the plurality of fourth objects based on information about each of the plurality of fourth objects, where the information about the fourth object includes a reference counting value of the fourth object and an identifier of an object referenced by the fourth object; generates information about at least one second reference cycle based on the reference relationship between the plurality of fourth objects, where information about each second reference cycle is used to describe a reference relationship between a plurality of objects forming the second reference cycle, and the at least one second reference cycle includes the first reference cycle; and stores the first reference cycle in the metadata of the first object.

In a possible implementation, the first reference cycle is a cyclic reference formed in a running process of one application program.

In a possible implementation, the processor obtains the reference counting value of the first object by using the communications interface, and determines that the reference counting value of the first object is the same as a first threshold, where the first threshold is a reference counting value of a start object in the first reference cycle, or the first object is associated with information about a plurality of reference cycles, the first threshold is a maximum value of reference counting values of a plurality of start objects, the plurality of start objects are in a one-to-one correspondence with the plurality of reference cycles, and the start object is a last object that is in the plurality of objects in the first reference cycle and that is released by an external object.

In a possible implementation, the first object is associated with a plurality of reference cycles, and the processor obtains, by using the communications interface, a hit count of each of the plurality of reference cycles and a quantity of times of matching by using information about each reference cycle, where the hit count is used to indicate a quantity of times of reclaiming an object in the reference cycle based on the information about the reference cycle; determines a hit rate of each of the plurality of reference cycles, where the hit rate is a ratio of the hit count to a quantity of times of performing the memory management method; and deletes information about a reference cycle whose hit rate is less than a preset ratio or set a status of information about a reference cycle whose hit rate is less than the preset ratio to an invalid state.

In a possible implementation, after the processor sets the status of the information about the reference cycle whose hit rate is less than the preset ratio to the invalid state, if the processor determines, after resources occupied by the first object and the one or more second objects are reclaimed, that a quantity of fifth objects whose occupied resources are unreclaimed is greater than a second threshold, where reference counting values of the fifth objects are greater than 0, the processor restores the status of the information about the reference cycle in the invalid state to a valid state.

According to a third aspect, a memory management apparatus is provided. The memory management apparatus may be a terminal device, or may be an apparatus in a terminal device. The memory management apparatus may include a processing module and an obtaining module. These modules may perform corresponding functions performed in any implementation example of the first aspect. Specifically, the obtaining module is configured to obtain stored information about a first reference cycle, where the first reference cycle is a cyclic reference formed by a plurality of objects, and the information about the first reference cycle includes the plurality of objects in the first reference cycle and a reference relationship between the plurality of objects; and the processing module is configured to: determine that a second reference cycle exists, where information about the second reference cycle matches the information about the first reference cycle, and the information about the second reference cycle includes a plurality of objects in the second reference cycle and a reference relationship between the plurality of objects; and reclaim memory occupied by the plurality of objects in the second reference cycle.

In a possible implementation, the information about the first reference cycle further includes a reference counting value, in the first reference cycle, of each object in the first reference cycle, and the information about the second reference cycle further includes a reference counting value, in the second reference cycle, of each object in the second reference cycle; and that information about the second reference cycle matches the information about the first reference cycle includes that the plurality of objects in the second reference cycle are in a one-to-one correspondence with the plurality of objects in the first reference cycle and the reference counting value of each object in the second reference cycle is equal to a reference counting value of a corresponding object in the first reference cycle.

In a possible implementation, the information about the first reference cycle includes an identifier of a referenced object, and the identifier of the referenced object is a storage address of the referenced object, an offset of a storage address of the referenced object relative to a storage address of a referencing object of the referenced object, or a name of the referenced object.

In a possible implementation, the information about the first reference cycle is stored in metadata of a first object, the first object is a last object that is in the plurality of objects in the first reference cycle and that is released by an external object, and the external object is an object, other than the plurality of objects in the first reference cycle, that references the first object.

In a possible implementation, the obtaining module is further configured to obtain a plurality of objects generated in a running process of an application program, where any one of the plurality of objects is an object whose reference counting value is greater than 0; and the processing module is further configured to: determine a reference relationship between the plurality of objects based on information about each of the plurality of objects, where the information about each object includes an identifier of an object referenced by each object; and generate and store the information about the first reference cycle based on the reference relationship between the plurality of objects.

In a possible implementation, the processing module is further configured to:
determine that a reference counting value of any object is less than or equal to a first threshold, and trigger the step of obtaining stored information about the first reference cycle, where the any object is included in the first reference cycle.

In a possible implementation, the any object is a last object that is in the plurality of objects in the first reference cycle and that is released by an external object, and the external object is an object, other than the plurality of objects in the first reference cycle, that references the first object.

In a possible implementation, the obtaining module is further configured to obtain a hit count of each reference cycle in the first reference cycle, where the hit count is used to indicate a quantity of times of reclaiming memory occupied by the plurality of objects in the second reference cycle; and the processing module is further configured to: determine a hit rate of each of a plurality of reference cycles, where the hit rate is a ratio of the hit count to a quantity of times of performing a memory management method; and delete information about the first reference cycle whose hit rate is less than a preset ratio or set a status of the information about the first reference cycle whose hit rate is less than the preset ratio to an invalid state.

In a possible implementation, the processing module is further configured to: determine that a quantity of unreclaimed objects is greater than a second threshold, where reference counting values of the unreclaimed objects are greater than 0; and restore the status of the information about the first reference cycle in the invalid state to a valid state.

In a possible implementation, the processing module is configured to:

determine, based on the information about the first reference cycle, information about the first object, and information about each of one or more second objects, that a reference cycle formed by the first object and the one or more second objects is the same as the first reference cycle, where the information about the first object is used to describe a reference relationship of the first object, and the information about each second object is used to describe a reference relationship of the second object.

In a possible implementation, the information about the first reference cycle includes a reference relationship of each of the plurality of objects and a reference counting value of each object in the first reference cycle, the information about the first object includes a reference counting value of the first object, the information about each second object includes a reference counting value of the second object, and the processing module is configured to:

determine that the reference relationship between the plurality of objects in the first reference cycle is the same as a reference relationship between the first object and the one or more second objects and that a reference counting value of a third object in the plurality of objects in the first reference cycle is the same as that of an object that is in the first object and the one or more second objects and that corresponds to the third object, where the third object is any one of the plurality of objects in the first reference cycle, and the plurality of objects in the first reference cycle are in a one-to-one correspondence with a plurality of objects including the first object and the one or more second objects.

In a possible implementation, the information about the first reference cycle includes an identifier of the third object and an identifier of an object referenced by the third object.

In a possible implementation, the identifier of the object referenced by the third object is a storage address of the object referenced by the third object, an offset of a storage address of the object referenced by the third object relative to a storage address of the third object, or a name of the object referenced by the third object.

In a possible implementation, the information about the first reference cycle is stored in metadata of a first object, the first object is a last object that is in the plurality of objects in the first reference cycle and that is released by an external object, the external object is an object, other than the plurality of objects in the first reference cycle, that references the first object, and the metadata is used to describe a name of the first object, a class of a data structure of the first object, and a storage location of the first object.

In a possible implementation, the obtaining module is further configured to obtain a plurality of fourth objects of the application program in the running process, where any one of the plurality of fourth objects is an object whose reference counting value is greater than 0; and the processing module is further configured to: determine a reference relationship between the plurality of fourth objects based on information about each of the plurality of fourth objects, where the information about the fourth object includes a reference counting value of the fourth object and an identifier of an object referenced by the fourth object; and generate information about at least one second reference cycle based on the reference relationship between the plurality of fourth objects, where information about each second reference cycle is used to describe a reference relationship between a plurality of objects forming the second reference cycle, and the at least one second reference cycle includes the first reference cycle; and store the first reference cycle in the metadata of the first object.

In a possible implementation, the first reference cycle is a cyclic reference formed in a running process of one application program.

In a possible implementation, the obtaining module is further configured to obtain the reference counting value of the first object; and the processing module is further configured to determine that the reference counting value of the first object is the same as a first threshold, where the first threshold is a reference counting value of a start object in the first reference cycle, or the first object is associated with information about a plurality of reference cycles, the first threshold is a maximum value of reference counting values of a plurality of start objects, the plurality of start objects are in a one-to-one correspondence with the plurality of reference cycles, and the start object is a last object that is in the plurality of objects in the first reference cycle and that is released by an external object.

In a possible implementation, the first object is associated with a plurality of reference cycles, and the obtaining module is further configured to:

obtain a hit count of each of the plurality of reference cycles and a quantity of times of matching by using information about each reference cycle, where the hit count is used to indicate a quantity of times of reclaiming an object in the reference cycle based on the information about the reference cycle; and the processing module is further configured to: determine a hit rate of each of the plurality of reference cycles, where the hit rate is a ratio of the hit count to a quantity of times of performing a memory management method; and delete information about a reference cycle whose hit rate is less than a preset ratio or set a status of information about a reference cycle whose hit rate is less than the preset ratio to an invalid state.

In a possible implementation, after the processing module sets the status of the information about the reference cycle whose hit rate is less than the preset ratio to the invalid state, the processing module is further configured to:

determine, after resources occupied by the first object and the one or more second objects are reclaimed, that a quantity of fifth objects whose occupied resources are unreclaimed is greater than a second threshold, where reference counting values of the fifth objects are greater than 0; and restore the status of the information about the reference cycle in the invalid state to a valid state.

According to a fourth aspect, an embodiment of this application further provides a computer-readable storage medium including instructions. When the instructions are run on a computer, the computer performs the method in the first aspect.

According to a fifth aspect, an embodiment of this application further provides a computer program product including instructions. When the computer program product runs on a computer, the computer performs the method in the first aspect.

According to a sixth aspect, an embodiment of this application provides a chip system. The chip system includes a processor, may further include a storage, and is configured to implement the method in the first aspect. The chip system may include a chip, or may include a chip and another discrete device.

For beneficial effects of the second aspect to the sixth aspect and the implementations of the second aspect to the sixth aspect, refer to descriptions of beneficial effects of the method and the implementations of the first aspect.

DESCRIPTION OF EMBODIMENTS

Figure 1:
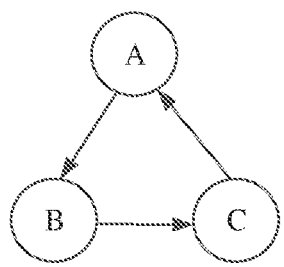
FIG. 1 is a schematic diagram of an example of a reference cycle.

To make the objectives, technical solutions, and advantages of the embodiments of this application clearer, the following describes in detail the technical solutions in the embodiments of this application with reference to the accompanying drawings and specific embodiments of the specification. The following describes some terms in the embodiments of this application to help understanding of a person skilled in the art.

(1) Computing device: the computing device is also referred to as an electronic device, and may be specifically a terminal device or a server. Specifically, the terminal device may be any computer system or device in various types of mobile or portable computer systems or devices that perform wireless communication. For example, the terminal device may include a mobile phone or a smartphone (for example, an iPhone™ or Android™ phone), a portable game device (for example, Nintendo DS™, PlayStation Portable™, Gameboy Advance™, or iPhone™), a laptop computer, a personal communications service (PCS) phone, a session initiation protocol (SIP) phone, a wireless local loop (WLL) station, a personal digital assistant (PDA), a portable Internet device, a music player, a data storage device, another handheld device, and a wearable device.

Alternatively, the computing device may further include a limited device, for example, a device with relatively low power consumption, a device with a limited storage capability, or a device with a limited computing capability. For example, the computing device includes an information sensing device such as a barcode reader, a radio frequency identification (RFID) device, a sensor, a global positioning system (GPS), or a laser scanner.

As an example instead of a limitation, in the embodiments of this application, an intelligent wearable device is a general term for wearable devices such as glasses, gloves, watches, clothes, and shoes that are developed by applying wearable technologies to intelligent designs of daily wear. The intelligent wearable device is a portable device that is directly worn on a body or integrated into clothes or an accessory of a user. The intelligent wearable device is not merely a hardware device, but is used to implement a powerful function through software support, data exchange, and cloud interaction. Generalized intelligent wearable devices include full-featured and large-sized devices that can implement complete or some functions without depending on smartphones, for example, smartwatches or smart glasses, and devices that focus on only one type of application function and need to work with other devices such as smartphones, for example, various smart bands, smart helmets, or smart jewelry for monitoring physical signs.

Alternatively, the terminal device may be a virtual reality (VR) device, an augmented reality (AR) device, a wireless terminal device in industrial control, a wireless terminal device in self-driving, a wireless terminal device in remote medical surgery, a wireless terminal device in a smart grid, a wireless terminal device in transportation safety, a wireless terminal device in a smart city, a wireless terminal device in a smart home, or the like.

(2) Object: the object is a basic element in code of an application program, for example, may be a string, a function, a variable, or an array. In an object-oriented programming language, the object is an instance of a class. The object has a unique identifier, and the object includes properties and methods. The methods are services that can be provided by the object, and the properties are properties (for example, a data structure, or a field included in the object) of the object.

(3) Memory leak: the memory leak means that although an object is no longer used (it may be considered that the object is an invalid object), a memory resource occupied by the object is not reclaimed, and therefore the memory resource cannot be used by another object, which is equivalent to a case in which the memory resource is not used by any valid object. As a result, there are fewer memory resources. A memory leak degree may be measured by a size of a memory resource occupied by an invalid object. A larger memory resource occupied by the invalid object indicates a more serious memory leak. For example, when a reference cycle exists and all objects in the reference cycle are not used by an object outside the reference cycle, all the objects in the reference cycle are invalid objects.

(4) Garbage collection (GC): Garbage collection, also referred to as a memory management mechanism, is a storage management mechanism in computer science. When a dynamic storage on a computer is no longer required, the storage should be released to free up the storage. Such storage resource management is referred to as garbage collection.

(5) In the embodiments of this application, "a plurality of" refers to two or more than two, and in view of this, "a plurality of" may also be understood as "at least two" in the embodiments of this application. "at least one" may be understood as one or more, for example, one, two, or more. For example, including at least one means including one, two, or more without limiting included content. For example, including at least one of A, B, and C may mean including A, B, C, A and B, A and C, B and C, or A, B, and C. The term "and/or" describes an association relationship between associated objects and represents that at least three relationships may exist. For example, A and/or B may represent the following three cases: Only A exists, both A and B exist, and only B exists. In addition, the character "I" generally indicates an "or" relationship between the associated objects unless specified otherwise. In the embodiments of this application, "node" and "object" may be used interchangeably.

In addition, unless otherwise stated, in the embodiments of this application, ordinal numbers such as "first" and "second" are intended to distinguish between a plurality of objects, and are not intended to limit an order, a time sequence, priorities, or importance of the plurality of objects.

Figure 2:
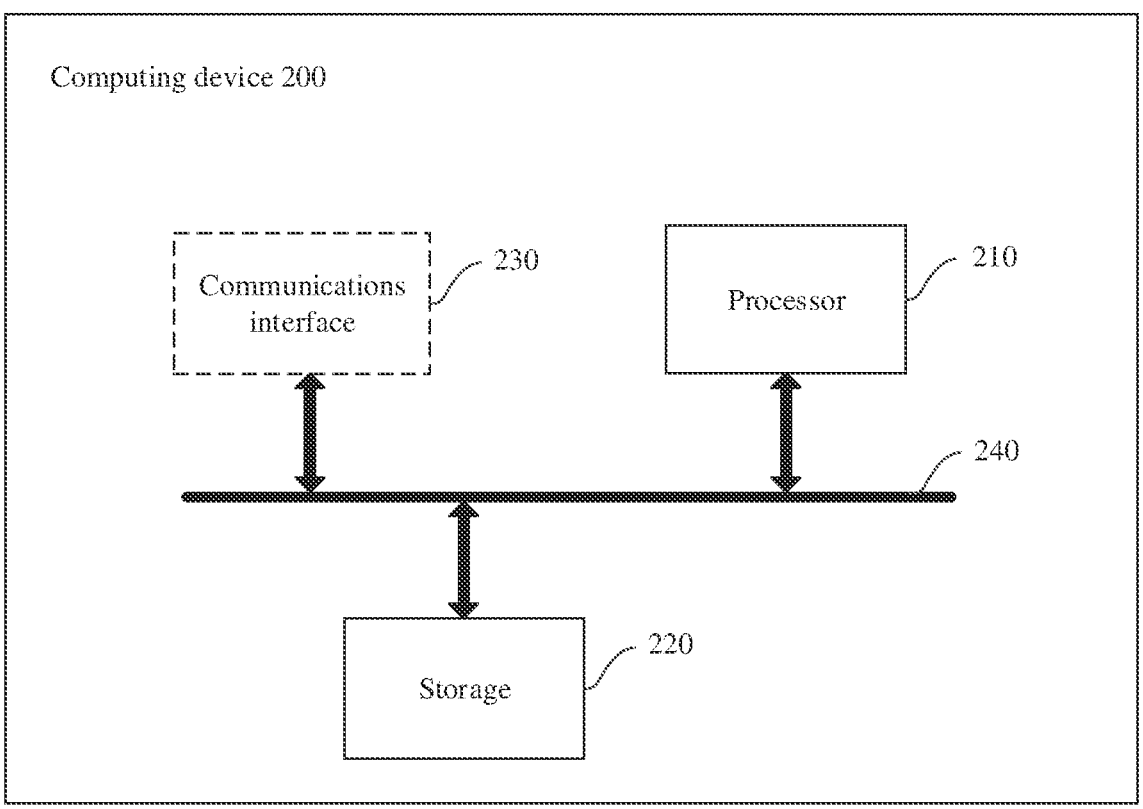
FIG. 2 is a schematic structural diagram of an example of a computing device according to an embodiment of this application.

The following describes a structural diagram of a computing device according to an embodiment of this application. FIG. 2 is an example schematic structural diagram of a computing device. As shown in FIG. 2, a computing device 200 includes components such as a processor 210, a storage 220, and a communications interface 230. A person skilled in the art may understand that the structure of the computing device shown in FIG. 2 does not constitute a limitation on the computing device. The computing device provided in this embodiment of the present technology may include components more or fewer than those shown in the figure, or combine some components, or have different component arrangements.

These components may communicate through one or more buses 240 or signal cables, and the buses may be classified into an address bus, a data bus, a control bus, and the like.

The processor 210 may be a central processing unit (CPU), a network processor (NP), or a combination of a CPU and an NP. The processor 210 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The storage 220 is configured to store computer programs such as an application program and an operating system. The processor 210 may invoke the computer programs stored in the storage 220, to implement a function defined by the computer programs.

For example, the processor 210 may execute the operating system to implement various functions of the operating system on the computing device 200, and the processor 210 may also execute the application program to implement various functions of the application program on the computing device 200. The operating system may be a Windows system, a MAC OS system, a Linux system, an Android system, or the like, or certainly may be a future-oriented computer system. The system described in the embodiments of this application is intended to describe the technical solutions in the embodiments of this application more clearly, and does not constitute a limitation on the technical solutions provided in the embodiments of this application. For example, the application program may be a third-party application program such as a WeChat™ application program or a Baidu™ application program, or may be a system application program, for example, a system service or a system user interface (system UI), of the computing device 200. It should be noted that the application program may be written in an object-oriented programming language, for example, Java™ Python™ PHP™, or Lua™, that allows objects to reference each other.

The storage 220 may include a program storage area and a data storage area. The program storage area may store an operating system, various application programs, and the like. The data storage area is configured to store data other than a computer program, for example, data (for example, various picture information and video information) generated in a running process of an operating system and an application program.

The storage 220 may include a volatile memory such as a random access memory (RAM); or the storage 220 may include a non-volatile memory such as a flash memory, a hard disk drive (HDD), or a solid-state drive (SSD); or the storage 220 may include a combination of the foregoing types of storages. There may be one or more storages 220. This may be specifically set based on a requirement. The storage 220 may be alternatively a storage in the processor 210. This is not limited herein.

The communications interface 230 is configured to connect the computing device 200 to another electronic device, is hardware allowing the computing device 200 to communicate on a network, and is hardware that can implement data packet sending and reception. For example, the communications interface 230 may be wired or wirelessly connected to a network to connect to another electronic device, for example, another external terminal device or server. When the computing device 200 is a terminal device, the communications interface 230 may be specifically a modem, an antenna, or a wireless fidelity (Wi-Fi) module. When the computing device 200 is a server, the communications interface 230 may be specifically a radio frequency unit or an antenna.

Figure 3:
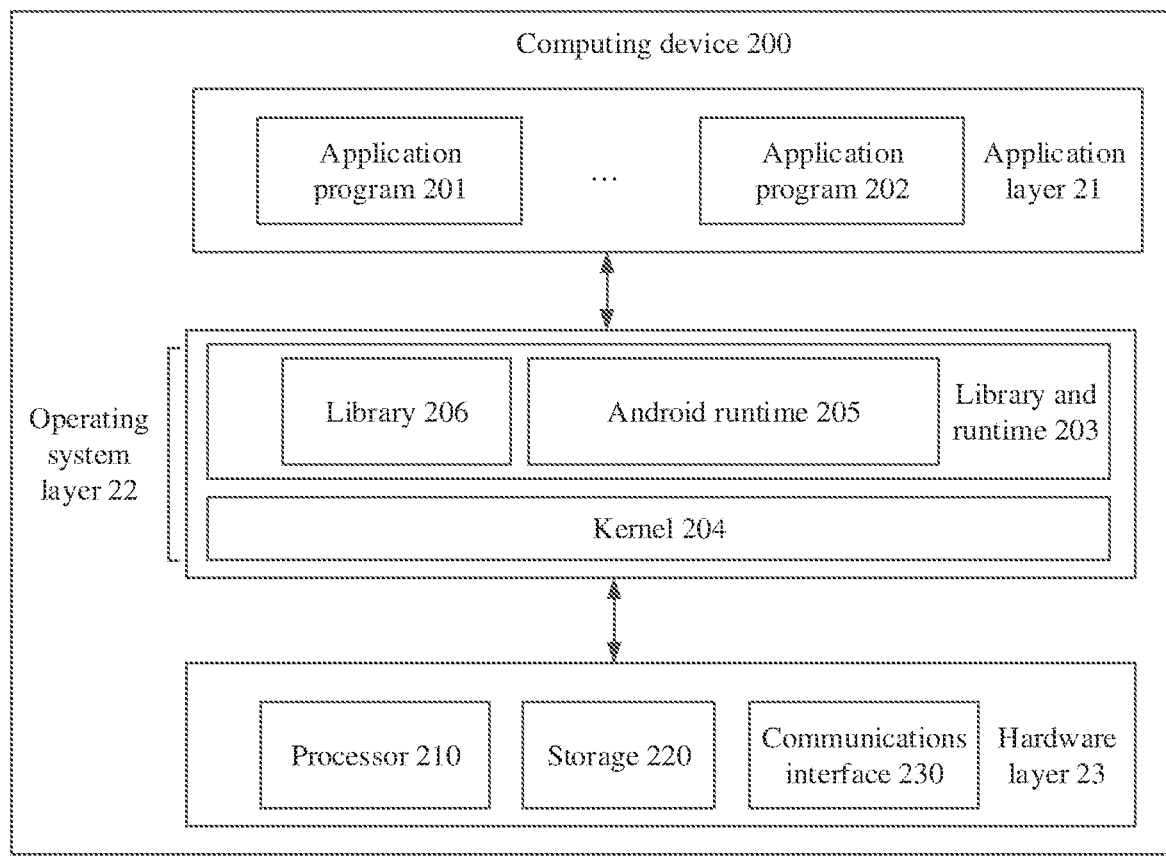
FIG. 3 is an example logical block diagram of a computing device 200 according to an embodiment of this application.

Further, in an embodiment, for example, an operating system of the computing device 200 is an Android system. As shown in FIG. 3, the computing device 200 may be logically divided into an application layer 21, an operating system layer 22, and a hardware layer 23. The hardware layer 23 may include the processor 210, the storage 220, and the communications interface 230 shown in FIG. 2. The application layer 21 includes one or more application programs (an application program 201 and an application program 202). A specific application program may be any type of application program such as a social application, an e-commerce application, or a browser. As software middleware between the hardware layer 23 and the application layer 21, the operating system 22 is a computer program that manages and controls hardware and software resources.

In an embodiment, the operating system layer 22 includes a library and runtime 203 and a kernel 204. The kernel 204 is configured to provide underlying system components and services, for example, power management, memory management, thread management, and hardware drivers. The hardware drivers include a Wi-Fi driver, a sensor driver, a positioning module driver, and the like. The library and runtime 203 is also referred to as a runtime library, and provides a required library file and a required execution environment for an executable program during runtime. In an embodiment, the library and runtime 203 includes an Android runtime (ART) 205 and a library 206. The library 206 is a library that provides support for an executable program during runtime, and includes a browser engine (for example, a webkit), a script execution engine (for example, a JavaScript engine), a graphics processing engine, and the like. The Android runtime 205 is a virtual machine or a virtual machine instance that can convert byte code of an application program into machine code. The virtual machine may provide an independent running environment for each application program in the application layer 21. A Dalvik virtual machine is used as an example. The Dalvik virtual machine is a register-based Java virtual machine, and is a basis for running an application program in the computing device 200 that uses an Android system. The Dalvik virtual machine is configured to compile and parse a dex file in a corresponding Android package (APK) to generate byte code or machine code that can run, to complete functions, for example, life cycle management, stack management, thread management, security and exception management, and garbage collection, of an object in the application program. The kernel 204 may provide, for the Dalvik virtual machine, an interface for invoking a memory resource.

Figure 4:
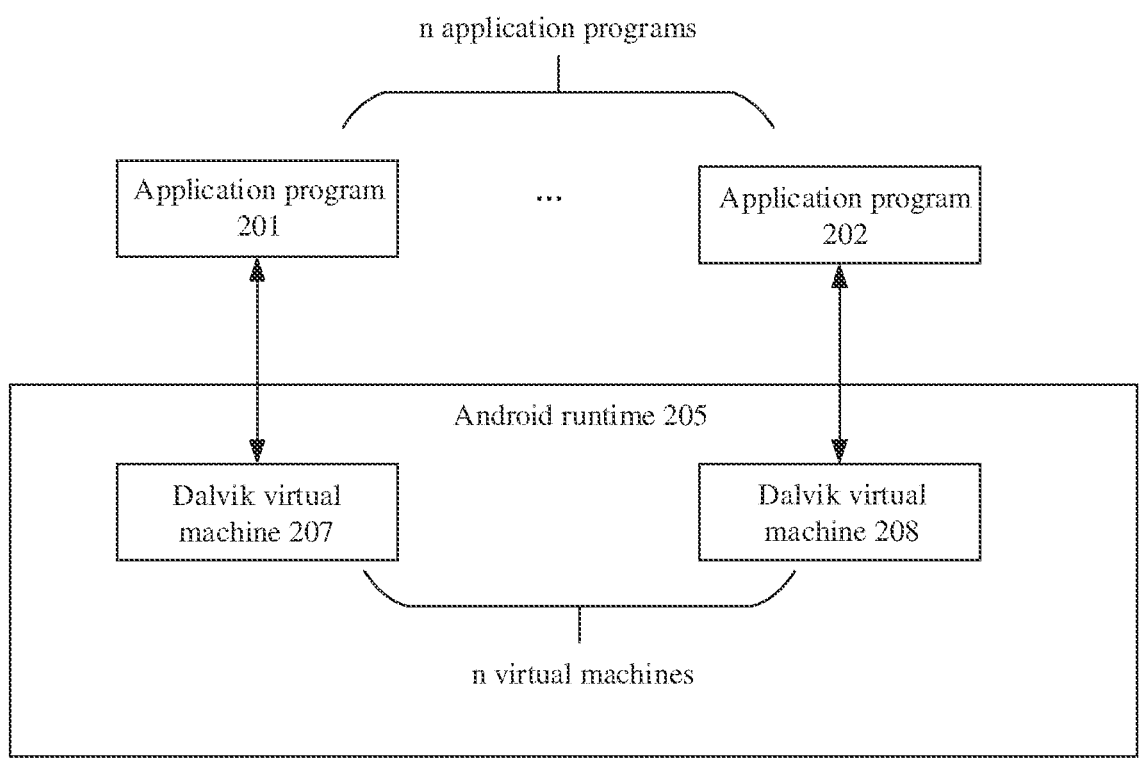
FIG. 4 is an example schematic diagram in which a plurality of Dalvik virtual machines coexist according to an embodiment of this application.

In the computing device 200, a plurality of Dalvik virtual machines may be allowed to coexist. For example, in FIG. 4, there are n application programs and n Dalvik virtual machines. When an application program needs to be started, the library and runtime 203 first creates a corresponding Dalvik virtual machine or virtual machine instance for the application program based on factors such as an environment required for running the application program (for example, a memory size required for running the application program). For example, if 3M of memory is required when the application program 201 runs, the library and Android runtime 203 creates a Dalvik virtual machine 207 whose memory is 3M for the application program by using an interface provided by the kernel 204. Then the application program 201 runs on the created Dalvik virtual machine 207. Correspondingly, a corresponding Dalvik virtual machine 208 is created for the application program 202.

Each function that can be implemented by an application program is implemented by using corresponding computer code. Because an object is a basic element of code, when one or more functions of an application program need to be implemented, code corresponding to a corresponding function is invoked, and a plurality of objects are created based on the code. Correspondingly, a module that is in a Dalvik virtual machine and that is configured to implement a memory management function needs to separately allocate required memory to each object created after the code is invoked.

Further, because memory of the Dalvik virtual machine is limited, to improve resource utilization, a mechanism for automatically managing the memory, namely, a garbage collection mechanism, is provided. Specifically, when the module that is in the Dalvik virtual machine and that is configured to implement memory management determines that one or more created objects are no longer used, the computing device releases memory resources occupied by the currently unused objects, so that the released memory resources can be used by another object.

To facilitate a person skilled in the art to clearly understand a garbage collection process, the following describes an example of an application scenario involved in this application.

Figure 5:
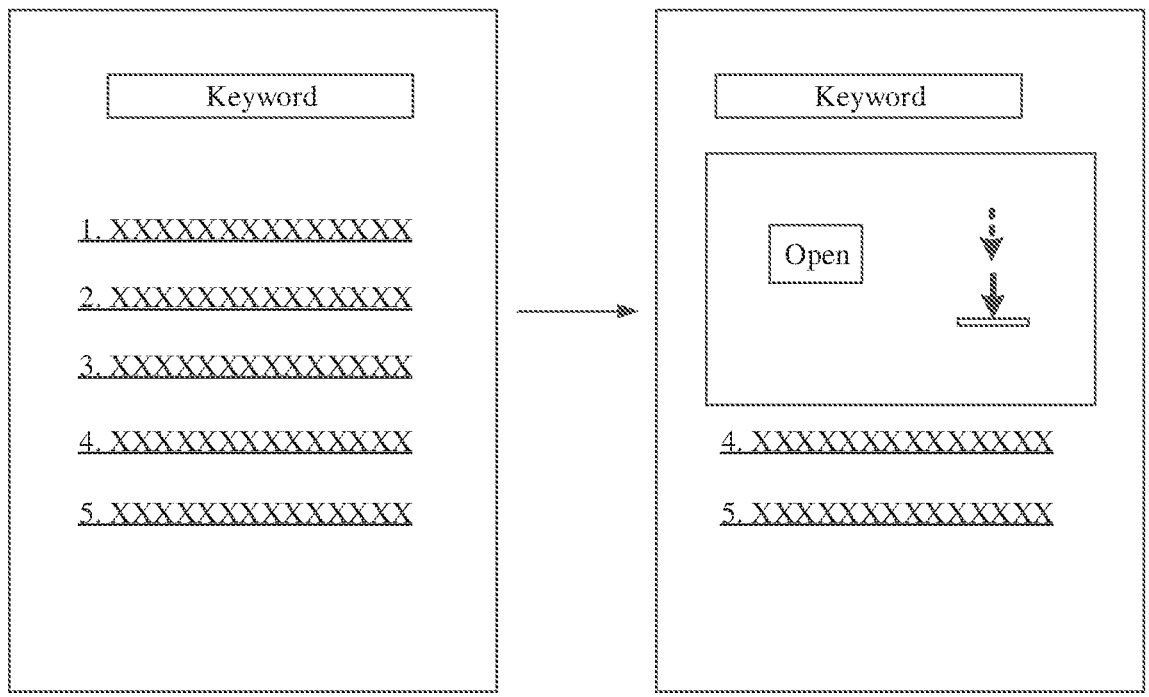
FIG. 5 is an example schematic diagram of an application scenario according to an embodiment of this application.

For example, the application program 201 in the computing device 200 is a browser application program. The browser application program runs on the Dalvik virtual machine 207. A user may download data such as a document or software by using the browser application program. As shown in FIG. 5, the user finds five documents in the browser application program by using a keyword. If the user wants to download the second document, the user may click a title of the second document, so that a dialog box is displayed in the browser application program. The dialog box includes two icons, the first icon is an icon for opening the document, and the second icon is an icon for downloading the document. For the second icon, to indicate the meaning of downloading the document more clearly, the second icon may be dynamically displayed. As shown in FIG. 5, at a first moment in FIG. 5, an arrow in the second icon at the first moment is located at a location corresponding to a dashed line, and at a second moment, the arrow in the second icon is located at a location corresponding to a solid line.

To display the second icon, the Dalvik virtual machine 207 creates four objects. The four objects are named as an object A, an object B, an object C, and an object D respectively. At a first moment, the object A references the object B, the object B references the object C, and the object C references the object D. At a second moment, the object C is releasing the object D (indicated by a dashed arrow in FIG. 6). At a third moment, the object C references the object A.

The following describes a garbage collection process in the conventional technology based on the foregoing application scenario.

Figure 6:
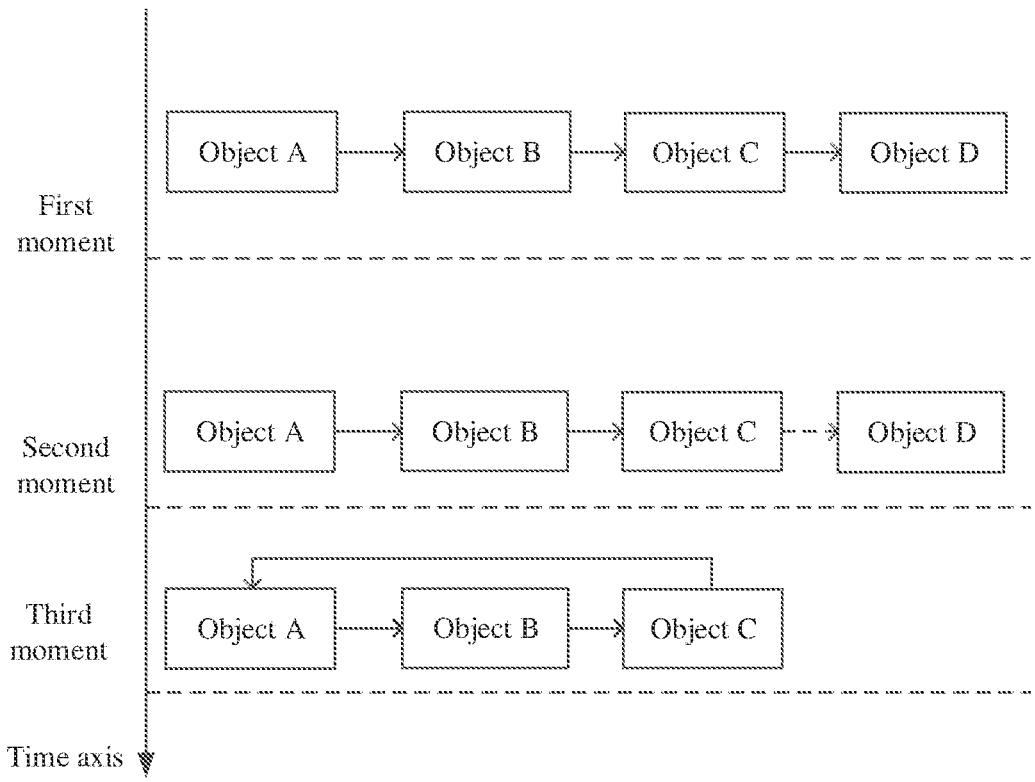
FIG. 6 is an example schematic flowchart of a processing procedure of an RC algorithm according to the conventional technology.

Currently, a mainstream algorithm for garbage collection in a Dalvik virtual machine is an RC algorithm. FIG. 6 is a schematic diagram of a processing procedure of the RC algorithm. In a running process of an application program, the RC algorithm performs timing for a quantity of reference times of an object to implement reclaiming of a memory resource.

After access of a referencing object ends, the Dalvik virtual machine stores a reference counting value of each object, and determines whether the reference counting value is 0. If the reference counting value is 0, the Dalvik virtual machine releases the object; otherwise, the Dalvik virtual machine performs no processing. At the first moment, because the object A references the object B, the object B references the object C, and the object C references the object D, the Dalvik virtual machine separately increases reference counting values of the object B, the object C, and the object D by 1, and records that the reference counting values of the object B, the object C, and the object D are all 1. Because none of the reference counting values of the object B, the object C, and the object D is 0, no processing is performed on the object B, the object C, and the object D. At the second moment, the object C releases the object D. Therefore, the Dalvik virtual machine subtracts the reference counting value of the object D by 1, so that the reference counting value of the object D becomes 0. Because the reference counting value of the object D is 0, the Dalvik virtual machine releases the object D. Because neither of the reference counting values of the object B and the object C is 0, no processing is performed on the object B and the object C. At a third moment, the object C references the object A. In this case, the Dalvik virtual machine increases a reference counting value of the object A by 1, and records that the reference counting value of the object A is 1. Because none of the reference counting values of the object A to the object C is 0, the Dalvik virtual machine does not perform garbage collection processing on the object A to the object C, in other words, does not reclaim memory resources occupied by the object A to the object C.

It can be learned from FIG. 6 that after the third moment, the object A to the object C also exist in the Dalvik virtual machine, and because of a cyclic reference cycle between the object A to the object C, the reference counting values of the objects are all 1. Because the reference counting values are not 0, the memory resources occupied by all the objects in the cyclic reference cycle cannot be reclaimed, causing a memory resource waste.

In view of this, the embodiments of this application provide a memory management method, which may be applied to a computing device. In a running process of an application program, the computing device first obtains information about a first reference cycle of a first object. The first reference cycle is a cyclic reference formed by a plurality of objects including the first object, and the information about the first reference cycle is used to describe a reference relationship between the plurality of objects. Then the computing device determines, by using the information about the first reference cycle, whether the first reference cycle is formed by the first object and one or more second objects. If the computing device determines that the first reference cycle is formed by the first object and the one or more second objects, the computing device reclaims resources occupied by the first object and the one or more second objects.

In the foregoing technical solutions, optionally, information about a reference cycle related to the first object may be prestored. For example, the reference cycle related to the first object is the first reference cycle. In a garbage collection process, the information about the first reference cycle is used to perform matching on a plurality of objects in the application program to determine whether the first reference cycle is formed by the plurality of objects. If the first reference cycle is formed, resources of the objects forming the first reference cycle are reclaimed. In this way, implementing a process of reclaiming a reference cycle by performing matching on information about the reference cycle can avoid a problem of a memory resource waste caused when a reference cycle cannot be reclaimed.

The technical solutions provided in the embodiments of this application are described below with reference to the accompanying drawings.

Figure 7:
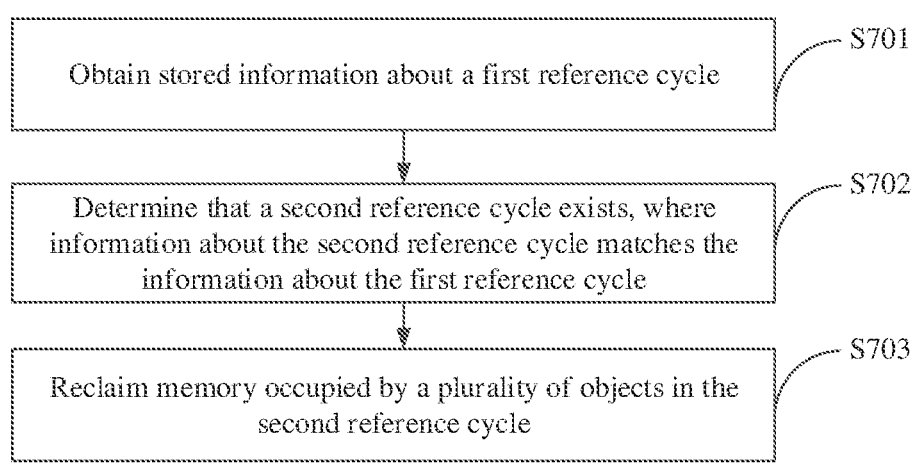
FIG. 7 is an example flowchart of a memory management method according to an embodiment of this application.

An embodiment of this application provides a memory management method. FIG. 7 is a flowchart of the method.

In the following description process, an example in which the technical solutions provided in this application are applied to the application scenario shown in FIG. 5 is used for description. For example, the method may be performed by the processor 210 in the computing device 200 shown in FIG. 2, which may mean that the method may be performed by a module that is in a Dalvik virtual machine, which is located in the library and runtime 203, in the computing device 200 and that is configured to implement a memory management function (which may be referred to as a memory management module in the Dalvik virtual machine).

S701: Obtain stored information about a first reference cycle.

In this embodiment of this application, the first reference cycle is a cyclic reference formed by a plurality of objects including a first object, and the information about the first reference cycle is used to describe a reference relationship between the plurality of objects forming the first reference cycle. It should be noted that each object in the first reference cycle does not include an external reference. As shown in FIG. 1, in other words, when the reference cycle is not referenced by another external object or is not used, a memory resource occupied by each object in the reference cycle can be reclaimed. The external object is an object other than the plurality of objects forming the first reference cycle.

For example, when the first object is the object A in the browser application program described in FIG. 5, the information about the first reference cycle of the first object may be the following reference relationship: The object A references the object B, the object B references the object C, and the object C references the object A. The information about the first reference cycle may be alternatively indicated by using a linked list: A→B→C→A. A specific form of the information about the first reference cycle is not limited in this embodiment of this application.

There may be one or more first reference cycles. When there are a plurality of first reference cycles, it may be understood that the first object and different other objects form different reference cycles. For example, the first object and a second object form a reference cycle, or the first object, a second object, and a third object form a reference cycle.

Figures 8, 9:
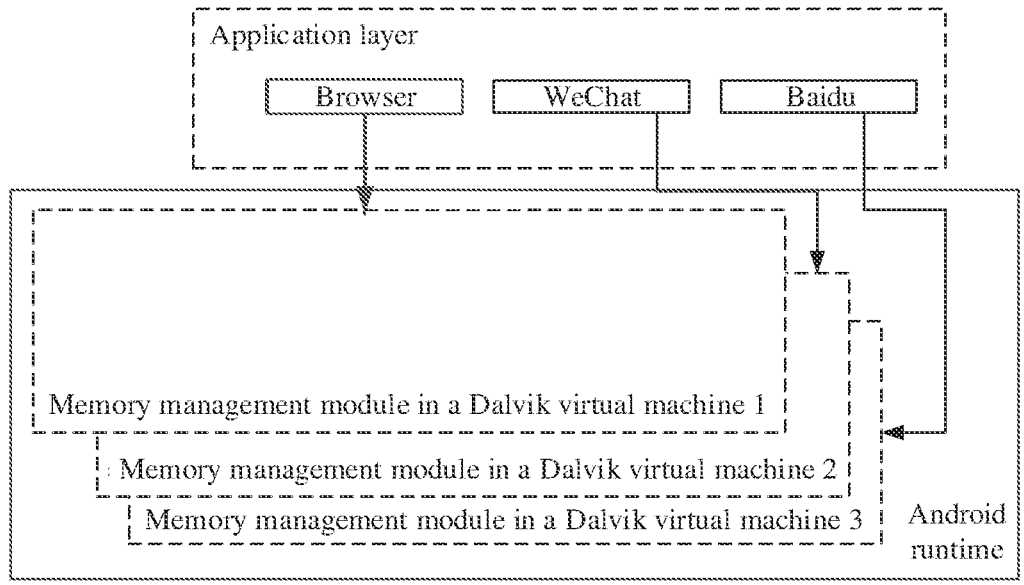
FIG. 8 is an example schematic diagram of a correspondence between a plurality of application programs and memory management modules of a plurality of Dalvik virtual machines in a computing device 200 according to an embodiment of this application.
FIG. 9 shows an example of code of a reference cycle described in a Java programming language according to an embodiment of this application.

In this embodiment of this application, the first object may be one of objects in an application program in a running state in the computing device 200, in other words, garbage collection processing needs to be performed on each object in each application program. For example, if the application program in the running state in the computing device 200 is the browser application program shown in FIG. 5, where the browser application program includes the object A to the object D shown in FIG. 5, the first object may be any one of the object A to the object D. Alternatively, when there are a plurality of application programs in the running state in the computing device 200, garbage collection processing may be performed on each application program. In this case, when garbage collection processing is performed on an application program, the first object may be one of objects in the application program. Refer to FIG. 8. For example, application programs in the running state in the computing device 200 are a browser application program and a WeChat application program. In this case, when a memory management module in a Dalvik virtual machine running the browser application program performs garbage collection processing on an object in the browser application program, the first object may be any object in the browser application program. When a memory management module in a Dalvik virtual machine 2 running the WeChat application program performs garbage collection processing on an object in the WeChat application program, the first object may be any object in the WeChat applications program. The first object is not limited herein. Memory management modules in different Dalvik virtual machines may run independently.

For step S701, in a possible embodiment, step S701 may include but is not limited to the following three manners of obtaining the information about the first reference cycle.

In a first manner, the information about the first reference cycle of the first object is preset.

In a second manner, the information about the first reference cycle of the first object is obtained in a running process of an application program.

In a third manner, the information about the first reference cycle of the first object is preset and is obtained in a running process of an application program.

The following separately describes the three manners.

First Manner

Before the memory management method in this embodiment of this application is used, the browser application program may first try to run on the computing device 200. The memory management module in the Dalvik virtual machine may perform garbage collection on the browser application program by using an RC algorithm. The memory management module obtains objects in respective heap memories of one or more processes of an application program. These objects are a plurality of objects that are not reclaimed by using the RC algorithm. The memory management module obtains information about each of the plurality of objects, obtains a reference cycle in the application program, and determines whether these objects form a reference cycle. The information about each object is used to describe a reference relationship of the object. For example, an object E and an object F are obtained, information about the object E is that the object E references the object F, and information about the object F is that the object F references the object E. Therefore, it may be determined, based on the information about the two objects, that the object E and the object F form a reference cycle. Therefore, the reference cycle formed by the object E and the object F is a valid reference cycle. The memory management module in the Dalvik virtual machine may obtain a reference cycle that is not reclaimed, by using the RC algorithm, in the WeChat application program in different scenarios, for example, in a start process or a switching process, or during a user operation. For example, the user operation is that a user browses a picture or video information on moments. Then the memory management module classifies the obtained reference cycle based on a data class (class) of a start object in the reference cycle (or may classify the obtained reference cycle based on a data class of another object in the reference cycle), and may sort various types of reference cycles by using quantities of reference cycles of different types as weights, to finally obtain a reference cycle type that causes a most serious memory leak or a memory leak to reach a threshold.

In this embodiment of this application, the reference cycle includes a plurality of objects, the plurality of objects include a start object and an end object of the start object, and the start object directly references the end object or the start object indirectly references the end object by using one or more intermediate objects. For example, if the start object is an object A, the end object is an object C, and the object A references the object C, it may be considered that the start object directly references the end object; if the object A references an object B, and the object B references the object C, the object B may be referred to as an intermediate object, and the object A references the object C by using the object B, that is, the start object references the end object by using the intermediate object.

In this case, the information about the reference cycle includes information about the start object, information about the one or more intermediate objects, and information about the end object.

The information about the start object includes a reference relationship describing that the start object references an intermediate object referenced by the start object and a reference counting value of the start object, and the reference counting value of the start object is used to indicate a quantity of times the start object is referenced by an object other than the start object in the first reference cycle.

Information about each intermediate object includes a reference relationship describing that the intermediate object references an intermediate object referenced by the intermediate object or references the end object and a reference counting value of the intermediate object, and the reference counting value of the intermediate object is used to indicate a quantity of times the intermediate object is referenced by an object other than the intermediate object in the first reference cycle.

The end object is an object that references the start object in the first reference cycle, the information about the end object includes a reference relationship describing that the end object references the start object and a reference counting value of the end object, and the reference counting value of the end object is used to indicate a quantity of times the end object is referenced by an object other than the end object in the first reference cycle.

In other words, a reference relationship between a plurality of objects is indicated by a reference relationship between the objects and a quantity of times each object is referenced by another object in the reference cycle.

Certainly, when there are a plurality of intermediate objects, for example, intermediate objects are an object B and an object C if an object A references the object B, the object B references the object C, and the object C references an object D, the reference relationship, in the information about the first reference cycle, describing that the intermediate object references an intermediate object referenced by the intermediate object may be understood as a reference relationship of referencing one intermediate object by the other intermediate object, for example, a reference relationship of referencing the object C by the object B.

Figures 10, 11:
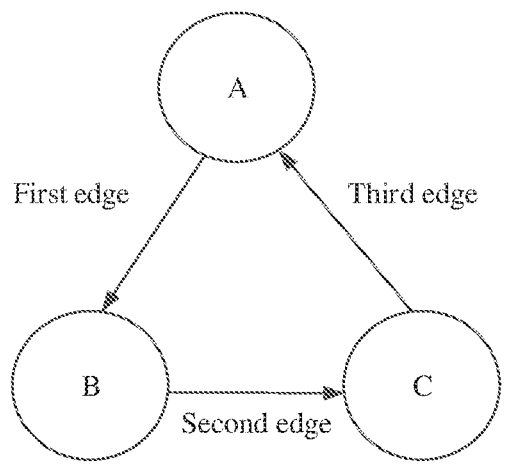
FIG. 10 shows an example of code of a reference cycle described in a Python programming language according to an embodiment of this application.
FIG. 11 is an example schematic diagram of a strongly connected graph corresponding to a first reference cycle according to an embodiment of this application.

For example, through the foregoing process, a reference cycle whose memory leak is most serious after a third moment in the browser application program shown in FIG. 5 is reference cycle code shown in FIG. 9 or FIG. 10. FIG. 9 shows reference cycle code described in a Java programming language, and FIG. 10 shows reference cycle code described in a Python programming language. The information about the reference cycle is as follows:

1. The plurality of objects included in the reference cycle. For example, the reference cycle includes three objects: the object A whose class is a class A, the object B whose class is a class B, and the object C whose class is a class C. The object A, the object B, and the object C each may be a start object. For ease of description, the following uses an example in which the object A is a start object.

2. A reference counting value of each object. For example, because the object A is referenced by the object C, the object B is referenced by the object A, and the object C is referenced by the object B, the reference counting value of each object is 1.

3. The reference relationship between the plurality of objects. For example, the object reference relationship in the reference cycle is that the object A references the object B, the object B references the object C, and the object C references the object A. Therefore, three edges (edge) are formed, and are an edge 1, an edge 2, and an edge 3 respectively.

Then the information about the reference cycle may be described by using a programming language and stored in the storage 220 of the computing device 200. For example, a dedicated storage space (which may be referred to as a reference cycle feature library) may be disposed in the storage 220, and is used to store the information about the reference cycle. The reference cycle feature library is used as a preset resource, and is imported when the browser application program starts, so that when reclaiming of the garbage reference cycle is triggered, the memory management module in the Dalvik virtual machine obtains the information about the reference cycle from the reference cycle feature library.

The reference relationship between the objects in the garbage reference cycle may be described by using the programming language in the following manner:

A reference relationship between the start object and an intermediate object referenced by the start object is indicated by using an identifier of the start object and a first reference identifier used when the start object references the intermediate object, and the first reference identifier is a storage address corresponding to the intermediate object, an offset of a storage address corresponding to the intermediate object relative to a storage address of the start object, or an identifier of the intermediate object.

Information about the intermediate object is used to describe a reference relationship between the intermediate object and the end object, the reference relationship between the intermediate object and the end object is indicated by using the identifier of the intermediate object and a second reference identifier used when the intermediate object references the end object, and the second reference identifier is a storage address corresponding to the end object, an offset of a storage address corresponding to the end object relative to the storage address of the intermediate object, or an identifier of the end object.

A reference relationship between the end object and the start object is indicated by using the identifier of the end object, the identifier of the start object, and a third reference identifier used when the end object references the start object, and the third reference identifier is the storage address corresponding to the start object, an offset of the storage address corresponding to the start object relative to the storage address of the end object, or the identifier of the start object.

The foregoing information is described by using the reference cycle code shown in FIG. 9. For the reference relationship between the start object and the intermediate object referenced by the start object, the identifier of the start object may be a name (for example, A) or a storage location (for example, if the storage address of the object A in memory is 0x0010, the object A may be identified by using 0x0010) of the start object. It can be learned from "class A{B b;}" that a field is defined in the object A, and a name of the field (field) is b, and a class of the field is the class B. Because a class of the object B is also the class B, it may indicate that the object A references the object B. The first reference identifier used when the start object references the intermediate object may be indicated by using a field name (for example, "b") in the start object. Alternatively, it can be learned from "a.b=b" that the first reference identifier used when the start object references the intermediate object may be indicated by "a.b". Alternatively, if a storage address of the object B is 0x0014, the object B may be directly indicated by using 0x0014 or may be indicated by using an offset (that is, 4) between the storage addresses of the object A and the object B.

There may be a plurality of reference cycles in one application program. Therefore, to prevent confusion between different objects, in this embodiment of this application, when a name of an object is used to indicate the object, the name of the object may be shaped. For example, a class of an object plus a jar name (for example, A:libTest.jar), or a class of an object plus a name of a function module in which the object is located (for example, if a function module in which the object A is located is dynamic display (dynamic display), A.dynamic display may be used) is used to uniquely identify the object.

In addition, in this embodiment of this application, to facilitate subsequent garbage collection by using the information about the reference cycle, a stack may be allocated to the reference cycle, and the stack is used to store an object that matches the information about the reference cycle. For example, when the plurality of objects included in the reference cycle are an object A, an object B, and an object C, because the object A is a start object, the object B is an intermediate object, and the object C is an end object, assuming that when the three objects are pushed into the stack, the object A is first pushed into the stack, an address of the object A in the stack is 0; the object B is second pushed into the stack, an address of the object B in the stack is 1; and the object C is last pushed into the stack, an address of the object C in the stack is 2. Therefore, each object may also be indicated by using an address of the object in the stack. For example, when the reference cycle includes only three objects, 0 indicates a start object, 1 indicates an intermediate object, and 2 indicates an end object. An index number in the stack and an address in the stack can be used interchangeably.

It should be noted that a specific use manner of the stack is described in the following corresponding steps.

For description of the reference relationship between the intermediate object and the end object referenced by the intermediate object and the reference relationship between the end object and the start object referenced by the end object, refer to the foregoing description of the reference relationship between the start object and the intermediate object referenced by the start object. An index number of each object in the stack and a field name in each object are unique and fixed.

For example, the information about the reference cycle may be described by using information about each of the plurality of objects forming the reference cycle and information about an edge between the end object and the start object of the garbage reference cycle. For example, the reference relationship in the garbage reference cycle is described by using information about the object A, information about the object B, information about the object C, and information about an edge between the object C and the object A.

The information about the start object includes a class and a name of the start object.

Information about an object (namely, the intermediate object and the end object) other than the start object includes an index number of an object that references the object in the stack, a field name in the object that references the object, a class of the object, and a reference counting value of the object. For example, the information about the object B may include an index number of the object A in the stack, a field name in the object A, a class of the object B, and an initial reference counting value of the object B.

Information about the edge includes an index number of the end object in the stack, an index number of the start object in the stack, and a field name in the end object. For example, the information about the edge includes an index number of the object C in the stack, the index number of the object A in the stack, and a field name in the object C.

It should be noted that different classes of objects may include a same name, and therefore, to accurately indicate an object, a class and a name of an object may be used together to identify the object. In addition, when a field domain in an object does not indicate an object referenced by the object, for example, the object B referenced by the object A is indicated by using another attribute instead of the field b in the object A, the field name used in the information used to describe the reference cycle may also be replaced with the another attribute. The field name is used as an example below.

For example, the garbage reference cycle shown in FIG. 9 or FIG. 10 is described by using cycle pattern code applied to the Java programming language. Specific content is as follows:

class:A:libTest.jar
    Cycle:2,1,1
    Node:0,b,B:libTest.jar,1
    Node:1,c,C:libTest.jar,1
    Edge:2,0,a The following describes a meaning of each piece of code in the foregoing cycle pattern code.

1. "class:A:libTest.jar": "class:A:libTest.jar" is used to describe information about a header node, namely, the start object of the reference cycle, where the header node may be any node in the reference cycle, and in the foregoing example, an example in which the header node of the reference cycle is the object A is used. There may be a plurality of reference cycles in one application program. Therefore, to prevent confusion between different objects, in this embodiment of this application, a class name plus a jar name is used to uniquely identify an object. When the header node is the object A, a description of the header node may be class:A:libTest.jar.

It should be noted that the jar name "libTest.jar" in the foregoing example is merely an example, and may be another name in actual use. In addition, in another implementation, a class name may be directly used to identify an object. In this case, the information about the header node is directly described as class:A. This is not limited herein.

2. "Cycle:2,1,1": "Cycle:2,1,1" is used to describe a quantity of nodes (Node) other than the header node in the reference cycle, a quantity of edges (Edge) that need to be separately described, and an RC value of the header node, that is, an RC value when the header node is not referenced by an object outside the reference cycle.

In the foregoing example, the first number is used to indicate the quantity of nodes other than the header node in the current reference cycle. Because the reference cycle includes the object A, the object B, and the object C, and the object A is the header node, the quantity of remaining nodes is "2".

The second number is used to indicate the quantity of edges that need to be separately described. The reference cycle includes two nodes in addition to the header node. In addition, when the foregoing information about the header node of the reference cycle is described, only a class and a name of the header node are described, and a reference relationship between the header node and another node is not described. However, for a reference cycle, objects in the reference cycle form a strongly connected graph. Therefore, even if the following description describes reference relationships of the other two nodes, information about one edge cannot be obtained from the information about the header node and information about the other nodes, in other words, this edge needs to be separately described. In this example, a value of the second number is 1.

The third number is used to indicate the RC value of the header node (which may also be referred to as an initial RC value of the object A). In the foregoing example, the header node is the object A, and the object A is referenced by the object C once. Therefore, a value of the third number is 1.

It should be noted that a sequence of the three numbers in the foregoing example may be randomly changed. For example, the number used to indicate the RC value of the header node may be placed in the first place of the three numbers, or the number used to indicate the quantity of other nodes is placed in the last place of the three numbers. This is not limited in this embodiment of this application.

3, "Node:0,b,B:libTest.jar,1" and "Node:1,c,C:libTest.jar,1": "Node:0,b,B:libTest.jar,1" and "Node:1,c,C:libTest.jar,1" are used to describe the information about the other two nodes other than the header node in the reference cycle. For a sequence of adding the information about the two nodes, refer to the reference relationship between the plurality of objects corresponding to the reference cycle. For example, when traversal is started from the header node (the object A is used as an example), the object B is traversed before the object C. In this case, the information about the object B may be first added to the cycle pattern code, and then the information about the object C may be added to the cycle pattern code. Certainly, information about each node may be added in another sequence, and this is not limited herein.

It should be noted that the reference relationship between the plurality of objects may be alternatively determined by using a strongly connected component (SCC) graph. A strongly connected component is formed by a plurality of nodes that can be connected to each other by using a specific quantity of directed paths, and the plurality of nodes and the specific quantity of directed paths form the strongly connected component graph (which may also be referred to as a strongly connected graph). For example, as shown in FIG. 11, an object A, an object B, and an object C are connected to each other. Therefore, the object A, the object B, and the object C form a strongly connected component, and the object A to the object C and the first edge to the third edge form a strongly connected component graph. If the object A is used as a start object, a reference relationship indicated in the strongly connected component graph is that first, the object A references the object B, then the object B references the object C, and finally, the object C references the object A.

When the information about the node, namely, the object B, is described, a reference relationship of the node is first pointed out: The node is referenced by the object A. The index number of the object A in the stack is "0", the field name in the object A is "b", a class of an object corresponding to the field b is B:libTest.jar, and an RC value of the object B is "1". In this case, information about the first node other than the header node is obtained. The information about the node, namely, the object C, is described in a same manner: The object C is referenced by the object B, an index number of the object B in the stack is "1", a field name in the object B is "c", a class of an object corresponding to the field c is C:libTest.jar, and an RC value of the object C is "1".

4. "Edge:2,0,a": "Edge:2,0,a" is used to describe the information about the edge that cannot be indicated by using the information about the header node and the information about other two nodes, that is, the information about the edge that needs to be separately described in "Cycle:2,1,1". It can be learned from the description in the third point that a reference relationship between nodes is recorded in information about each node, in other words, information about edges in the strongly connected graph corresponding to the reference cycle can be obtained. For example, it can be learned from the information about the first node that the first edge is that the object A points to the object B, it can be learned from the information about the second node that the object B points to the object C, and the third edge that the object C points to the object A (that is, the edge between the last object and the start object in the reference cycle) needs to be described by using this statement. A quantity of Edges is a difference between a total quantity of edges to a quantity of nodes in the reference cycle.

Specifically, the first number is used to indicate an index number of the object C in the stack and is "2", the second number is used to indicate the index number of the object A in the stack and is "0", and a name of a field referenced by the object C is "a". Therefore, the statement records that the third edge is that the object C points to the object A.

It should be noted that the Edge statement may follow the Node statement or may precede the Node statement, and this is not limited herein.

In addition, it should be noted that the foregoing example is one piece of cycle pattern code generated by using the object A as a header node. In actual use, for each reference cycle, a plurality of pieces of cycle pattern code whose quantity is the same as a quantity of nodes included in the reference cycle may be generated. For example, the object B may be used as a header node to generate one piece of cycle pattern code with a start row "class:B:libTest.jar", and the object C may be used as a header node to generate one piece of cycle pattern code with a start row "class:C:libTest.jar". Content in each piece of cycle pattern code is similar to that in the cycle pattern code with the start row "class:A: libTest.jar". It should be noted that one piece of cycle pattern code may be understood as a section of code including the four types of content described above.

Certainly, there is a reference cycle formed by objects whose life cycles (that is, duration between a moment at which the node is created and a moment at which use of the node is stopped) differ relatively greatly in the reference cycle. For example, a life cycle of the object C is 10 milliseconds (ms), a life cycle of the object B is 1 second (s), and a life cycle of the object A is 2s. It can be learned that a maximum difference between the life cycles of the objects is approximately 2s. If corresponding cycle pattern code is generated for each object in the reference cycle, invalid matching is brought, increasing overheads of a processor. For example, if cycle pattern code corresponding to the object C is generated, matching needs to be performed once in each 10 ms, but because the life cycles of the object A and the object B are far greater than 10 ms, the object A and the object B are necessarily referenced by an object outside the reference cycle in the 10 ms. Therefore, the reference cycle is not a reference cycle that needs to be reclaimed, and the matching is invalid matching. Therefore, in this case, for a reference cycle, only information that is about the reference cycle and that corresponds to an object with a relatively large life cycle may be set.

After the foregoing cycle pattern code is obtained, the cycle pattern code may be stored in the reference cycle feature library in an image form. Specifically, the cycle pattern code may be stored in metadata of different classes based on the information about the header node in the cycle pattern code. For example, in the foregoing example, if one piece of cycle pattern code is generated by using the object A as a header node, the cycle pattern code may be stored in metadata of the class A. Preset cycle pattern code may overwrite a reference cycle class that causes a relatively serious memory leak in the application program. For example, in an Android system, the preset cycle pattern code may overwrite 90% of reference cycles in an application program.

It can be learned from the foregoing process that the foregoing cycle pattern code is preconfigured in the computing device 200.

Certainly, the reference cycle feature library may include information about a plurality of reference cycles, and information about each reference cycle may be marked by using an identifier of a start object in the reference cycle. Therefore, the memory management module in the Dalvik virtual machine may determine, from the information about the plurality of reference cycles based on the identifier of the information about each reference cycle, the information about the first reference cycle corresponding to the first object.

In this case, the obtained reference cycle may be a reference cycle generated in a running process of a system application or a function module of a system.

Second Manner

Before the memory management module in the Dalvik virtual machine performs the garbage collection in this embodiment of this application, when the browser application program is still running, the memory management module may control the browser application program to suspend running, to obtain reference cycle garbage generated in the running process of the browser application program, so that information about a corresponding reference cycle is generated.

Certainly, to reduce impact on the running process of the browser application program, the memory management module in the Dalvik virtual machine may generate the information about the corresponding reference cycle when the computing device 200 is in an idle state (for example, when the computing device 200 is in a sleep mode or when the computing device 200 is in a low-power-consumption state). Certainly, the information about the reference cycle may be alternatively generated in another time period, and this is not limited herein.

A process in which the memory management module in the Dalvik virtual machine generates the information about the corresponding reference cycle may include but is not limited to the following steps:

The memory management module in the Dalvik virtual machine first obtains a plurality of third objects that are not referenced by any object in the application program (in other words, reference counting values are 0) in the running process of the application program, and then determines a reference relationship between the plurality of third objects based on description information that is of each third object and that is used to describe a reference counting value of the third object and an identifier of an object referenced by the third object. Finally, the memory management module generates information about at least one second reference cycle based on the reference relationship between the plurality of third objects. The at least one second reference cycle is a cyclic reference cycle formed by all or some of the third objects, and information about each second reference cycle is used to describe a reference relationship between a plurality of objects forming the second reference cycle.

Figure 12:
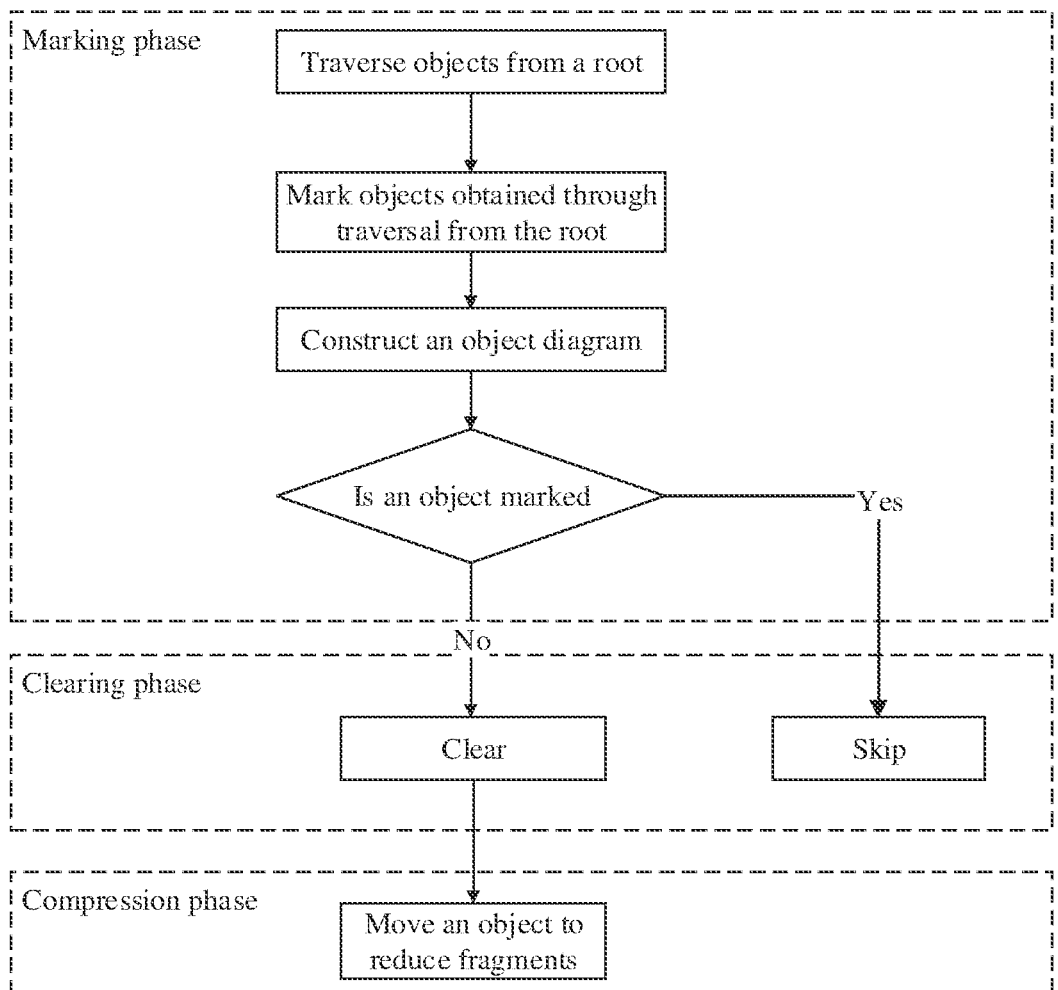
FIG. 12 is a flowchart of an example of determining whether a first reference cycle is formed between a first object and at least one second object according to an embodiment of this application.

For example, the memory management module in the Dalvik virtual machine may use a tracing algorithm. FIG. 12 is a processing flowchart of referencing the tracing algorithm. Referencing the tracing algorithm mainly includes three phases: a marking phase, a clearing phase, and a compression phase.

In the marking phase, objects are traversed by using a root node of an object tree as a start point. If an object is reachable from the root node, in other words, the root node indirectly references the object, the object is a reachable object, and the object is marked. Otherwise, the object is an unreachable object, and the object is not marked. Therefore, an object diagram is constructed.

After the clearing phase is completed, the compression phase is entered. The computing device may move, based on a current distribution status of an uncleared object in the memory, a location of the uncleared object in the memory and/or perform compression processing on the uncleared object, so that the uncleared object occupies continuous memory space in the memory, thereby reducing memory holes.

It is determined, by using the tracing algorithm, whether each object in the browser application program is a reachable object, and the object is marked if the object is reachable, so that unmarked objects are a plurality of third objects that cannot be reclaimed in the browser application program. The plurality of third objects include an object A, an object B, and an object C.

Then the memory management module in the Dalvik virtual machine separately obtains description information of the object A, the object B, and the object C. For example, in the browser application program, code used to describe the object A is "class A{B b;}", code used to describe the object B is "class B{C c;}", and code used to describe the object C is "class C{A a;}". In this case, it can be learned from the code used to describe the three objects that the object A references the object B, the object B references the object C, and the object C references the object A. Therefore, the object A, the object B, and the object C form a strongly connected component, and the information about the reference cycle is generated based on a strongly connected graph corresponding to the strongly connected component. The information about the reference cycle is similar to corresponding content in the first manner.

Certainly, when the third objects include a plurality of objects other than the object A to the object C, and the plurality of objects can form another strongly connected component, the memory management module in the Dalvik virtual machine may generate information about a corresponding reference cycle based on a strongly connected graph corresponding to each strongly connected component. To ensure accuracy of the generated information about the reference cycle, the memory management module in the Dalvik virtual machine may further check strong connectivity of the reference cycle based on the generated information about the reference cycle. For example, the memory management module traverses objects in the reference cycle based on the information about the reference cycle. If each object in the reference cycle can be traversed, it indicates that the reference cycle corresponding to the information about the reference cycle has strong connectivity; otherwise, the reference cycle corresponding to the information about the reference cycle has no strong connectivity (namely, non-strong connectivity). Therefore, information about a reference cycle corresponding to a reference cycle with non-strong connectivity can be removed.

Third Manner

Before the browser application program starts, information about a garbage reference cycle may be prestored in the storage 220 in the first manner. Then, in the running process of the browser application program, information about a reference cycle in the browser application program is obtained again in the second manner and is stored in the storage 220, so that it can be ensured that all reference cycle garbage in the browser application program can be collected, thereby ensuring effectiveness of the memory management method in this embodiment of this application.

Because the third manner is a combination of the first manner and the second manner, a specific process is the same as those of the foregoing two manners.

After obtaining information about a reference cycle in the browser application program, the memory management module in the Dalvik virtual machine may load the information about the reference cycle into metadata corresponding to a start object of the reference cycle. Therefore, when the information about the reference cycle is required, the information may be directly obtained from the metadata corresponding to the object. The metadata is used to describe a name of the object, a class of a data structure of the object, and a storage location of the object.

In another case, the memory management module may not obtain the information about the reference cycle corresponding to the first object. For example, a reference cycle formed by an object A uses an object B as a header node to describe the reference cycle shown in FIG. 9 or FIG. 10, and one piece of cycle pattern code is generated and stored in metadata of the object B, so that the cycle pattern code is not stored in metadata of the object A. In this case, the object A does not trigger a subsequent reference cycle garbage collection process.

In addition, in the foregoing description, information about one reference cycle is used as an example for description. In actual use, one application program may include a plurality of reference cycles, and the plurality of reference cycles include the first reference cycle corresponding to the first object. In this case, a processing process of each reference cycle is similar to the foregoing process. In this embodiment of this application, a quantity of reference cycles included in one application program is not limited. In addition, the first reference cycle is a cyclic reference cycle formed in a running process of one application program. It may be understood that there is a correspondence between information about a reference cycle and an application program. Different reference cycles may be formed in running processes of different application programs, and cyclic reference cycles formed in different application programs cannot be shared.

S702: Determine that a second reference cycle exists, where information about the second reference cycle matches the information about the first reference cycle.

In this embodiment of this application, the information about the second reference cycle includes a plurality of objects in the second reference cycle and a reference relationship between the plurality of objects. The plurality of objects in the second reference cycle may be a plurality of objects formed by the first object and one or more second objects.

It is determined, based on the information about the first reference cycle, information about the first object, and information about the one or more second objects, that the first object and the one or more second objects form the first reference cycle. The information about the first object is used to describe a reference relationship of the first object, any one of the one or more second objects is an object directly or indirectly referenced by the first object, and the information about the second object is used to describe a reference relationship of the second object. For example, if an object A references an object B, the object B references an object C, and the object C references an object D, the object A indirectly references the object B, the object C, or the object D.

Because each object may reference another object, after the object references the another object, the memory management module in the Dalvik virtual machine may allocate a part of memory to the object, to store information about the object referenced by the object. For example, the first object is the object A in the browser application program shown in FIG. 5. Because the object A references the object B, the information about the object A may include an identifier of the object B (which, for example, may be a name of the object B or the storage address of the object B), or the information about the object A may store a linked list, where the linked list records a reference relationship of "object A→object B". The information about the second object is similar to the information about the first object. In this embodiment of this application, specific forms of the information about the first object and the information about the second object are not limited.

In this embodiment of this application, step S702 may include but is not limited to the following two manners:

First Determining Manner

When the first object is a start object of the first reference cycle, and the plurality of objects in the first reference cycle include the start object and an end object of the start object, the memory management module in the Dalvik virtual machine determines that the reference relationship between the plurality of objects in the first reference cycle is the same as a reference relationship between the first object and the one or more second objects, the plurality of objects in the first reference cycle are in a one-to-one correspondence with the first object and the one or more second objects, and reference counting values of an object in the plurality of objects in the first reference cycle and a corresponding object in the first object and the one or more second objects are the same. In this case, the memory management module determines that the first object and the one or two second objects form the first reference cycle. In this embodiment of this application, corresponding objects may be understood as a same object.

For example, the first object is the object A shown in FIG. 5. Because the information about the first reference cycle of the object A is "The object A references the object B, the object B references the object C, the object C references the object A, and reference counting values of the object A to the object C are all 1", the memory management module in the Dalvik virtual machine may separately obtain information about the object A to the object C, determine whether the information about the object A includes the identifier of the object B, determine whether the information about the object B includes an identifier of the object C, and determine whether the information about the object C includes an identifier of the object A. If yes, the memory management module determines whether the information about the object C includes the identifier of the object B. If no, the memory management module determines that the reference counting value of the object B is 1, and is the same as the reference counting value of the object B in the information about the first reference cycle. The memory management module determines, in a same manner, whether the reference counting values of the object A and the object C are the same as the reference counting values of the corresponding objects in the information about the first reference cycle. When a result is yes for each of the foregoing determining processes, the memory management module determines that the object A to the object C form the first reference cycle.

Second Determining Manner

When the reference relationship between the start object and the intermediate object referenced by the start object is indicated by using the identifier of the start object and the first reference identifier used when the start object references the intermediate object, the information about the intermediate object is used to describe the reference relationship between the intermediate object and the end object, the reference relationship between the end object and the start object is indicated by using the identifier of the end object, the identifier of the start object, and the third reference identifier used when the end object references the start object, and there are two second objects, the memory management module in the Dalvik virtual machine determines, based on the first object and the first reference identifier included in the information used to describe the reference relationship between the start object and the intermediate object referenced by the start object, that one of the two second objects is an object referenced by the first object;

determines, based on the first second object and the second reference identifier included in the information used to describe the reference relationship between the intermediate object and the end object, that the other second object in the two second objects is an object referenced by the one of the two second objects;

determines, based on the second object and the third reference identifier included in the information used to describe the reference relationship between the end object and the start object, that the first object is an object referenced by the other second object in the two second objects;

then determines that the reference relationship between the plurality of objects in the first reference cycle is the same as the reference relationship between the first object and the plurality of second objects; and determines that a reference counting value of the first object is the same as the reference counting value of the start object, a reference counting value of the one of the two second objects is the same as the reference counting value of the intermediate object, and a reference counting value of the other second object in the two second objects is the same as the reference counting value of the end object.

Figure 13:
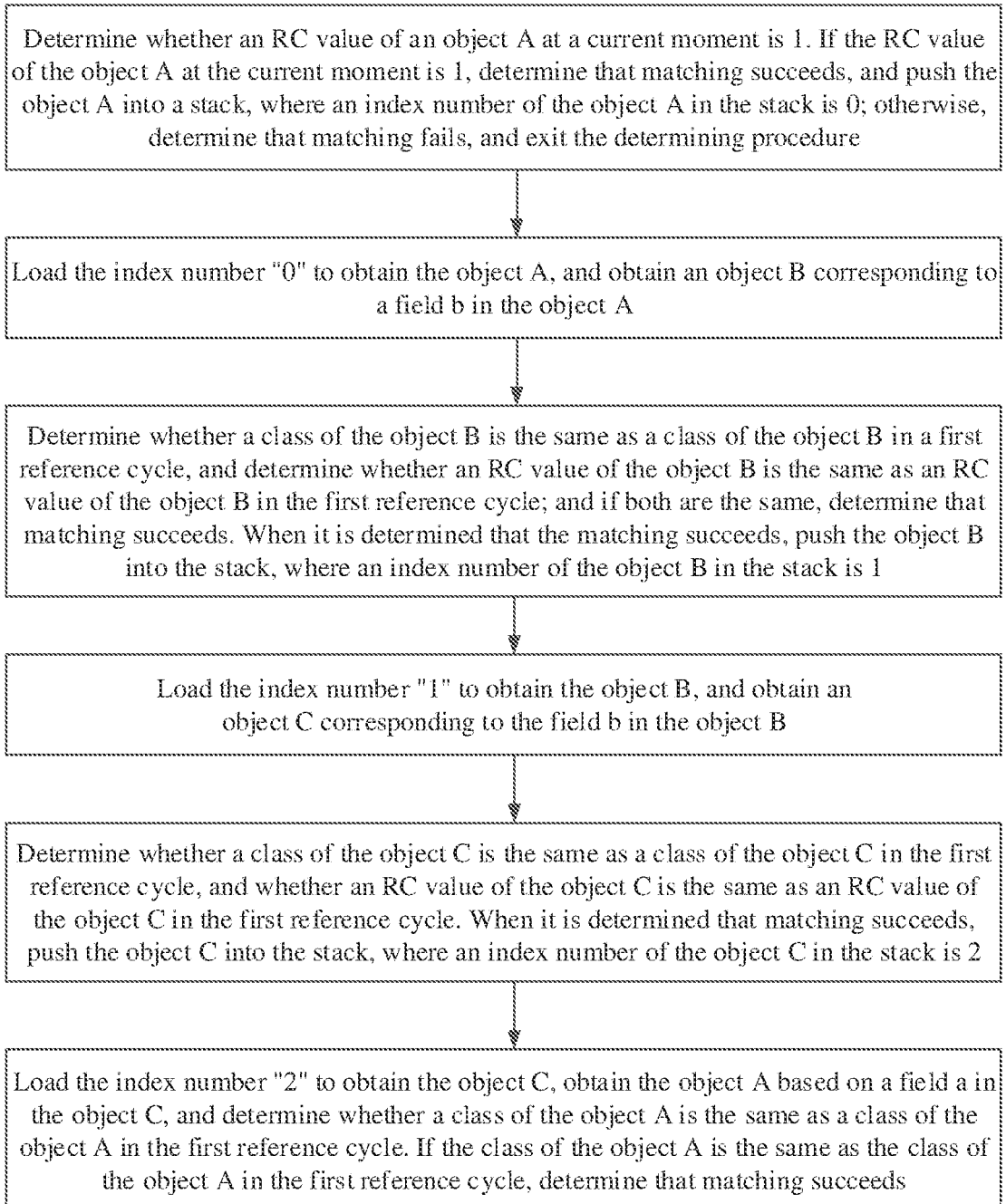
FIG. 13 is an example schematic diagram of performing garbage collection by using a tracing algorithm according to the conventional technology.

Refer to FIG. 13. For example, after obtaining the information about the first reference cycle corresponding to the object A, the memory management module in the Dalvik virtual machine may determine whether an RC value of the object A is the same as the RC value of the start object in the information about the first reference cycle. For example, it can be learned from "Cycle:2,1,1" that the RC value of the start object is 1. The memory management module in the Dalvik virtual machine may separately obtain information about the object A to the object C, and determine that only the information about the object C includes an identifier of the object A. In this case, the memory management module determines that the reference counting value of the object A is 1, and is the same as the RC value of the start object in the information about the first reference cycle, matching succeeds, and the memory management module pushes the object A into a stack (that is, the stack allocated to the garbage collection process in step S701), where the index number of the object A in the stack is 0, and performs subsequent steps. Otherwise, matching fails, and the memory management module exits the determining procedure, and determines that a memory resource occupied by the reference cycle formed by the object A does not need to be reclaimed.

After matching on the object A succeeds, the memory management module in the Dalvik virtual machine determines, based on the information "Node:0,b,B:libTest.jar,1" about the first node in the information about the first reference cycle, that an index number of an object referencing the intermediate object in the stack is 0, so that the memory management module in the Dalvik virtual machine obtains, from the stack, the object whose index number is 0, namely, the object A. The memory management module obtains, based on the field name "b" in the object A, an object referenced by the object A. Because the field name "b" indicates the object B, the memory management module determines that the object A references the object B. Then the memory management module obtains the information about the object B, and determines whether a class of the object B is the class of B:libTest.jar. If yes, the memory management module determines whether the reference counting value of the object B is 1. A manner of determining whether the reference counting value of the object B is 1 is the same as the manner of determining whether the reference counting value of the object A is 1. If yes, the memory management module determines that matching on the object B succeeds, and pushes the object B into the stack, and in this case, the index number of the object B in the stack is 1.

After matching on the object B succeeds, the memory management module in the Dalvik virtual machine determines, based on the information "Node:1,c,C:libTest.jar,1" about the second node in the information about the first reference cycle, that an index number of an object referencing the end object in the stack is 1, so that the memory management module in the Dalvik virtual machine obtains an object whose index number is 1, namely, the object B. The memory management module obtains, based on the field name "c" in the object B, an object referenced by the object B. Because the field name "c" indicates the object C, the memory management module determines that the object B references the object C. Then the memory management module obtains the information about the object C, and determines whether a class of the object C is the class of C:libTest.jar. If yes, the memory management module determines whether the reference counting value of the object C is 1. A manner of determining whether the reference counting value of the object C is 1 is the same as the manner of determining whether the reference counting value of the object A is 1. If yes, the memory management module determines that matching on the object C succeeds, and pushes the object C into the stack, and in this case, the index number of the object C in the stack is 2. In this way, a schematic diagram of a distribution relationship, shown in FIG. 14, between the objects in the reference cycle in the stack is obtained.

After matching on the object C succeeds, the memory management module in the Dalvik virtual machine determines, based on the information "Edge:2,0,a" about the edge in the information about the first reference cycle, that an index number of an object referencing the start object in the stack is 2, so that the memory management module in the Dalvik virtual machine obtains, from the stack, the object whose index number is 2, namely, the object C. The memory management module learns, based on the field name "a" in the object C, that an object referenced by the object C is the object A. The memory management module determines, based on the information about the object A, that a class of the object A is classA:libTest.jar, and is the same as a class of the header node in the information about the first reference cycle. In this case, the memory management module in the Dalvik virtual machine determines that matching between the first object and the at least one second object and the first reference cycle succeeds.

It should be noted that in a specific implementation process, a color marking method may be used to mark an actual object. For example, when it is determined that the first object matches the start object in the first reference cycle, the first object may be marked as gray, and if the first object does not match the start object in the first reference cycle, the first object is not marked. For example, information used to indicate a color may be stored in metadata of each object. For example, 1 bit is used to indicate a color of the object. When a value of the bit is 0, it indicates white; or when a value of the bit is 1, it indicates gray. Certainly, the color may be marked in another manner. For example, a memory resource may be allocated to store a correspondence between an object and a color. Examples are not listed herein. The same is true of the at least one second object.

S703: Reclaim memory occupied by the plurality of objects in the second reference cycle.

The memory management module in the Dalvik virtual machine determines that the object A to the object C form the first reference cycle, and in this case, the memory management module in the Dalvik virtual machine reclaims resources occupied by the object A to the object C.

If the color marking method is used to mark each object, after the foregoing determining process ends, the memory management module may determine whether each of the first object and the at least one second object is gray. If all of the first object and the at least one second object are gray, each of the first object and the at least one second object may be marked as white, to wait for a memory distributor to reclaim a memory resource of the object. If at least one of the first object and the at least one second object is not gray, the memory management module determines that a memory resource of each object cannot be reclaimed. In this way, correctness of concurrent reference cycle reclaiming can be ensured by using a meaning represented by each color in the color marking method (for example, gray indicates that an object is being matched, and white indicates that matching on the object is completed and the object can be reclaimed) and a logical sequence of the colors.

It can be learned that according to the foregoing technical solutions, a memory resource occupied by an object in a reference cycle can be reclaimed. In addition, to reclaim objects in the reference cycle, the memory management module in the Dalvik virtual machine only needs to perform matching between information about a plurality of objects that need to be determined and information about the reference cycle, so that a calculation amount is small, thereby reducing calculation overheads of a reference cycle reclaiming process.

Figures 14, 15:
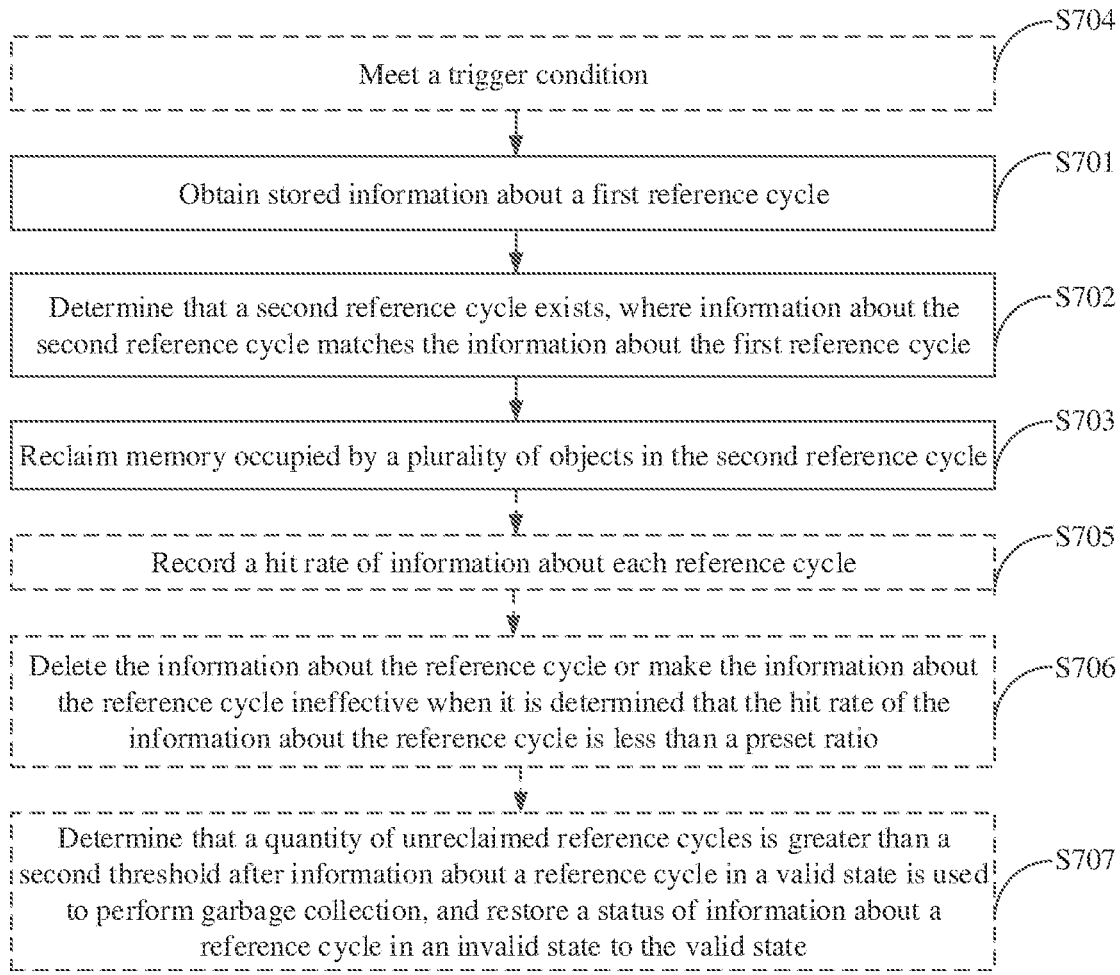
FIG. 14 is a flowchart of another example of a memory management method according to an embodiment of this application.
FIG. 15 is an example schematic block diagram of a communications apparatus according to an embodiment of this application.

To reduce a quantity of times the memory management module in the Dalvik virtual machine performs the foregoing matching process, in this embodiment of this application, referring to FIG. 15, before step S701 is performed, the memory management module in the Dalvik virtual machine may first perform step S704, that is, determine whether the first object meets a trigger condition.

In this embodiment of this application, the trigger condition is a condition used to trigger a process of performing garbage collection on the first object. The trigger condition may be that the reference counting value of the first object is the same as a first threshold. The first threshold may be estimated by a person skilled in the art based on an actual use case. For example, a person skilled in the art may determine the first threshold based on a quantity of reference times of the object A in a reference cycle that may exist in the browser application program. If the object A can be referenced only by the object C, the first threshold may be 1, or if the object A may be referenced by the object B and the object C, the first threshold may be 2. In this embodiment of this application, for example, the first threshold is 1.

For example, the first threshold may be alternatively determined based on information in cycle pattern code, and the first threshold is a reference counting value of the header node in the information about the reference cycle. For example, if the reference counting value of the header node in the cycle pattern code is 1, the first threshold is set to 1. Alternatively, if the first object is associated with information about a plurality of reference cycles, the first threshold is a maximum value of reference counting values of header nodes in the information about the plurality of reference cycles that is associated with the first object. For example, when metadata of the object A stores two pieces of cycle pattern code, where a reference counting value of a header node in one piece of cycle pattern code is 1, and a reference counting value of a header node in the other piece of cycle pattern code is 2, the first threshold may be set to 2.

In the running process of the browser application program, the memory management module in the Dalvik virtual machine may allocate a part of memory, where the memory is used to store a reference counting value of each object. For example, the memory may store tables shown in Table 1 to Table 3. After the first moment in the application scenario shown in FIG. 5, the table shown in Table 1 is obtained. At the first moment, the object A references the object B, the object B references the object C, and the object C references the object D. Therefore, Table 1 includes three objects: the object B, the object C, and the object D. Because each object is referenced once by another object, a reference counting value of each object is 1. After the second moment in the application scenario shown in FIG. 5, Table 1 is refreshed to obtain the table shown in Table 2. At the second moment, the object C releases the object D, and therefore a reference counting value of the object D is 0 in Table 2. After the third moment in the application scenario shown in FIG. 5, Table 2 is refreshed to obtain the table shown in Table 3. At the third moment, the object C references the object A, and therefore a reference counting value of the object A is 1 in Table 3.

TABLE 1

| Identifier of an object | Reference counting value |
| --- | --- |
| A | 0 |
| B | 1 |
| C | 1 |
| D | 1 |

TABLE 2

| Identifier of an object | Reference counting value |
| --- | --- |
| A | 0 |
| B | 1 |
| C | 1 |
| D | 0 |

TABLE 3

| Identifier of an object | Reference counting value |
| --- | --- |
| A | 1 |
| B | 1 |
| C | 1 |
| D | 0 |

Certainly, to reduce memory resources occupied by the tables, when a reference counting value of an object becomes 0, the object may be deleted from the tables. For simplification of the specification, this case is not described in detail in this embodiment of this application.

It can be learned from the table shown in Table 3 that the reference counting value of the object A after the third moment is 1, and is the same as the first threshold. Therefore, the memory management module in the Dalvik virtual machine determines that the first object meets the trigger condition, and performs the garbage collection process of step S701 to step S703 on the first object.

It should be noted that in this case, in step S702, the memory management module in the Dalvik virtual machine may directly obtain a reference counting value of each of the first object and the at least one second object from the tables without perform determining based on information about each object, so that a garbage collection process can be simplified.

It should be noted that step S704 is an optional step, in other words, does not necessarily need to be performed, and is represented by a dashed line in FIG. 15.

To improve a hit rate of information about a reference cycle and reduce a quantity of times the memory management module in the Dalvik virtual machine performs invalid matching, in this embodiment of this application, after step S703 is completed, step S705 may be further performed, that is, a hit rate of information about each reference cycle is recorded.

In this embodiment of this application, if the first object includes information about a plurality of reference cycles, the memory management module in the Dalvik virtual machine may record a hit rate of information about each reference cycle. The hit rate of the information about each reference cycle is a ratio of a hit count of the information about the reference cycle to a quantity of times of using the information about the reference cycle to perform matching, and the hit count of the information about the reference cycle is used to indicate a quantity of times of successfully reclaiming an object in the reference cycle based on the information about the reference cycle.

Each time the memory management module in the Dalvik virtual machine uses the information about the reference cycle in the storage 220 to perform matching on a reference cycle corresponding to the first object, the memory management module updates a quantity of times of using the information about the reference cycle to perform matching (which may also be referred to as a quantity of use times), to increase the quantity of use times by 1. In addition, the memory management module in the Dalvik virtual machine updates a hit count of the information about the reference cycle based on a result of the current matching (in other words, whether a memory resource occupied by an object in the reference cycle can be reclaimed). For example, when the result of the current matching is to reclaim the memory resource occupied by the object in the reference cycle, the hit count of the information about the reference cycle is increased by 1; or when the result of the current matching is not to reclaim the memory resource occupied by the object in the reference cycle, the hit count of the information about the reference cycle remains unchanged. Then the memory management module obtains and updates, based on an updated quantity of use times and an updated hit count, a hit rate of the information about the reference cycle after the current matching.

S706: Delete the information about the reference cycle or make the information about the reference cycle ineffective when it is determined that the hit rate of the information about the reference cycle is less than a preset ratio.

When a hit rate of information about a reference cycle is excessively low, it indicates that the reference cycle cannot be reclaimed by using the information about the reference cycle. If the processor 210 is executing a relatively large calculation task, a cycle pattern code with an excessively low hit rate and on which frequent matching is performed increases load of the processor 210. Therefore, the memory management module in the Dalvik virtual machine may delete the information about the reference cycle with an excessively low hit rate, so that the load of the processor 210 can be reduced, and execution efficiency of a reference cycle reclaiming process can be increased.

When the hit rate of the information about the reference cycle is less than the preset ratio, it is considered that the hit rate of the information about the reference cycle is excessively low. The preset ratio may be 5%, 7%, or the like, and is not limited herein.

In addition, when the first object is associated with information about a plurality of reference cycles, most suitable information about a reference cycle may be selected based on hit rates of the information about the reference cycles. For example, information about a reference cycle with a highest hit rate is determined as the most suitable information about the reference cycle. Therefore, the processor 210 may also perform the foregoing matching process only based on the most suitable information about the reference cycle, so that the load of the processor 210 can be further reduced.

For another example, a cyclepattern_info data structure may be created for each piece of cycle pattern code. The cyclepattern_info data structure is used to describe information about the cycle pattern code. The cyclepattern_info data structure may include at least one of the following information:

1. A quantity of nodes included in the cycle pattern code;
2. A quantity of edges included in the cycle pattern code;
3. An RC value of a header node included in the cycle pattern code;
4. A hit count of the cycle pattern code;
5. A quantity of use times of the cycle pattern code;
6. Whether the cycle pattern code is the last cycle pattern code of the first object;
7. Whether the cycle pattern code is valid.

The first type of information to the fifth type of information are described in the foregoing description.

For the sixth type of information, when the first object is associated with a plurality of pieces of cycle pattern code, each piece of cycle pattern code may be numbered, and cycle pattern code with a largest number is used as the last cycle pattern code associated with the first object, and is indicated in a cyclepattern_info data structure of the last cycle pattern code. In this way, after the memory management module in the Dalvik virtual machine determines, based on the cyclepattern_info data structure, the last cycle pattern code associated with the first object, the memory management module in the Dalvik virtual machine may not need to search for cycle pattern code associated with the first object, so that load of the memory management module can be reduced.

For the seventh type of information, when the memory management module in the Dalvik virtual machine determines that a hit rate of cycle pattern code is excessively low, the memory management module may not delete the cycle pattern code, but indicates, in a cyclepattern_info data structure of the cycle pattern code, that the cycle pattern code is invalid, so that the memory management module in the Dalvik virtual machine does not use the cycle pattern code to perform the foregoing matching process. The memory management module in the Dalvik virtual machine may periodically delete invalid cycle pattern code. For example, the memory management module performs a search process once a week to delete invalid cycle pattern code. In this way, a processor resource waste caused when the processor performs matching on invalid cycle pattern code can be avoided.

S707: Determine that a quantity of unreclaimed reference cycles is greater than a second threshold after information about a reference cycle in a valid state is used to perform garbage collection, and restore a status of information about a reference cycle in an invalid state to the valid state.

Specifically, because generated reference cycles may be different when an application program is in different running states, for example, in a start process, a switching process, or a plug-in running process, information about a same reference cycle cannot be used to reclaim reference cycles in all running states. For example, in the first 10s of a start process of the browser application program, if a hit rate of the information about the first reference cycle is 10%, and a hit rate of the information about the second reference cycle is 3%, the memory management module in the Dalvik virtual machine sets the information about the second reference cycle to be invalid. Then, in a switching process of the browser application program, when the information about the first reference cycle is used to perform garbage collection, a quantity of garbage objects is greater than the second threshold, where the threshold may be set by a person skilled in the art based on an actual use requirement. In this case, it indicates that a favorable garbage collection effect cannot be achieved when the information about the first reference cycle is used to perform garbage collection, and the memory management module in the Dalvik virtual machine may set the information about the second reference cycle to be valid, so that garbage collection can be performed by using the information about the second reference cycle.

It should be noted that step S705 to step S707 are optional steps, in other words, do not necessarily need to be performed, and are represented by dashed lines in FIG. 15.

In the foregoing technical solutions, matching is performed between the information about the first reference cycle of the first object and information about the first object and the at least one second object, to implement a reference cycle reclaiming process, so that a problem of a memory resource waste caused by a reference cycle can be avoided. In addition, to reclaim an object in a reference cycle, the computing device only needs to perform matching between information about an actual object and information about the reference cycle, so that a calculation amount is small, thereby reducing calculation overheads of a reference cycle reclaiming process.

In the foregoing embodiments provided in this application, the method provided in the embodiments of this application is described from a perspective of a computing device. To implement functions in the foregoing method provided in the embodiments of this application, the computing device may include a hardware structure and/or a software module, and implement the foregoing functions in a form of a hardware structure, a software module, or a hardware structure and a software module. Whether a function in the foregoing functions is performed in a form of a hardware structure, a software module, or a hardware structure and a software module depends on particular applications and implementation constraints of the technical solutions.

Figure 16:
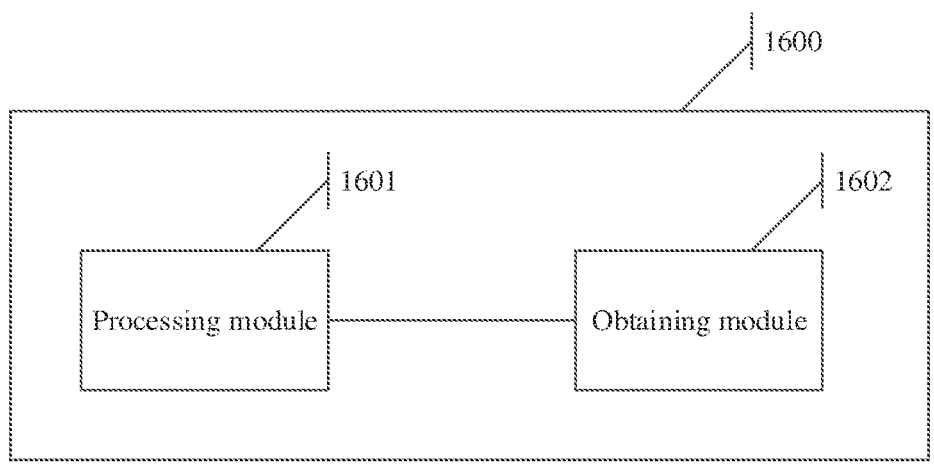
FIG. 16 is a flowchart of another example of a memory management method according to an embodiment of this application.

FIG. 16 is a schematic structural diagram of a memory management apparatus 1600. The memory management apparatus 1600 may be a computing device, and can implement functions of the computing device in the method provided in the embodiments of this application. Alternatively, the memory management apparatus 1600 may be an apparatus that can support a computing device in implementing functions of the computing device in the method provided in the embodiments of this application. The memory management apparatus 1600 may be a hardware structure, a software module, or a hardware structure and a software module. The memory management apparatus 1600 may be implemented by a chip system. In this embodiment of this application, the chip system may include a chip, or may include a chip and another discrete device.

The memory management apparatus 1600 may include a processing module 1601 and an obtaining module 1602.

The processing module 1601 may be configured to perform step S701 in the embodiment shown in FIG. 7 or FIG. 15, and/or support another process of the technology described in this specification.

The obtaining module 1602 may be configured to perform step S702 and step S703 in the embodiment shown in FIG. 7, or perform step S702 to step S707 in the embodiment shown in FIG. 15, and/or support another process of the technology described in this specification. The obtaining module 1602 is used by the memory management apparatus 1600 to communicate with another module, and the another module may be a circuit, a component, an interface, a bus, a software module, a transceiver, or any other apparatus that can implement communication.

All content related to each step in the foregoing method embodiments may be cited in function descriptions of a corresponding function module.

An embodiment of this application further provides a memory management apparatus, and the memory management apparatus may be a terminal or a circuit. The memory management apparatus may be configured to perform actions performed by the computing device in the foregoing method embodiments.

Figure 17:
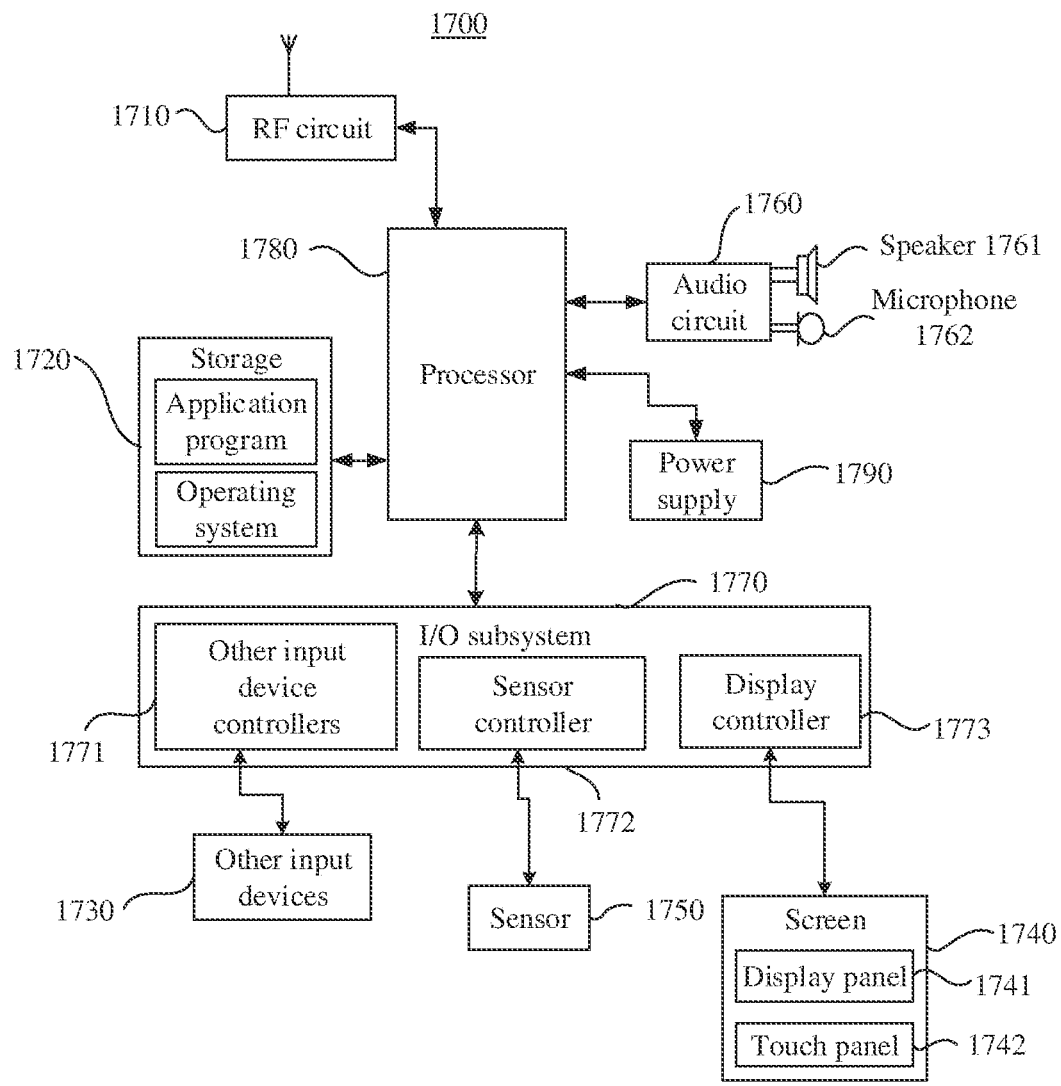
FIG. 17 is an example schematic block diagram of a memory management apparatus according to an embodiment of this application.

For example, the terminal is a mobile phone. FIG. 17 is a block diagram of a partial structure of a mobile phone 1700 related to the embodiments of this application. The mobile phone 1700 includes components such as a radio frequency (RF) circuit 1710, a storage 1720, other input devices 1730, a screen 1740, a sensor 1750, an audio circuit 1760, an I/O subsystem 1770, a processor 1780, and a power supply 1790. A person skilled in the art may understand that the structure of the mobile phone shown in FIG. 17 constitutes no limitation on the mobile phone, and the mobile phone may include more or fewer components than those shown in the figure, or may combine some components, or may split some components, or may have a different component arrangement. A person skilled in the art may understand that the screen 1740 is a user interface (UI), and the mobile phone 1700 may include more or fewer user interfaces than those shown in the figure.

The following describes all components of the mobile phone 1700 in detail with reference to FIG. 17.

The RF circuit 1710 may be configured to receive and send a signal in an information receiving or sending process or a call process. In particular, after receiving downlink information of a base station, the RF circuit 1710 sends the downlink information to the processor 1780 for processing, and in addition, sends related uplink data to the base station. The RF circuit usually includes but is not limited to an antenna, at least one amplifier, a transceiver, a coupler, a low noise amplifier (LNA), a duplexer, and the like. In addition, the RF circuit 1710 may further communicate with a network and another device through wireless communication. The wireless communication may use any communication standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The storage 1720 may be configured to store computer programs such as an application program and an operating system shown in FIG. 17. The processor may invoke the computer programs stored in the storage, to implement functions defined by the computer programs. For example, the processor executes the operating system to implement various functions of the operating system on the mobile phone 1700. The operating system may be Linux®, Windows®, or another operating system. This is not limited in this embodiment of this application. The storage 1720 may mainly include a program storage area and a data storage area. The program storage area may store an operating system, an application program required by at least one function (for example, a sound playing function or an image display function), and the like. The data storage area may store data (for example, audio data or a phone book) created based on use of the mobile phone 1700, and the like. In addition, the storage 1720 may include a high-speed random access memory, and may further include a non-volatile memory such as at least one magnetic disk storage component, a flash memory component, or another volatile solid-state storage component.

The other input devices 1730 may be configured to receive entered digital or character information, and generate key signal input related to user setting and function control of the mobile phone 1700. Specifically, the other input devices 1730 may include but are not limited to one or more of a physical keyboard, a function key (for example, a volume control key or an on/off key), a trackball, a mouse, a joystick, an optical mouse (the optical mouse is a touch-sensitive surface that does not display visual output, or an extension of a touch-sensitive surface formed by a touchscreen), and the like. The other input devices 1730 are connected to other input device controllers 1771 in the I/O subsystem 1770, and exchange a signal with the processor 1780 under control of the other input device controllers 1771.

The screen 1740 may be configured to display information entered by a user or information provided to a user, and various menus of the mobile phone 1700, and may further receive user input. Specifically, the screen 1740 may include a display panel 1741 and a touch panel 1742. The display panel 1741 may be configured in a form such as a liquid crystal display (LCD) or an organic light-emitting diode (OLED). The touch panel 1742, also referred to as a touchscreen, a touch-sensitive screen, or the like, may collect a touch operation or a non-touch operation of the user on or near the touch panel 1742 (for example, an operation of the user on or near the touch panel 1742 by using any suitable object or accessory such as a finger or a stylus, which may also include a somatosensory operation, where the operation includes a single-point control operation, a multi-point control operation, or another operation type), and drive a corresponding connection apparatus based on a preset program. Optionally, the touch panel 1742 may include two parts: a touch detection apparatus and a touch controller. The touch detection apparatus detects a touch orientation and a gesture of the user, detects a signal brought by a touch operation, and sends the signal to the touch controller. The touch controller receives touch information from the touch detection apparatus, converts the touch information into information that can be processed by the processor, then sends the information to the processor 1780, and can receive and execute a command sent by the processor 1780. In addition, the touch panel 1742 may be implemented by using a plurality of types such as a resistive type, a capacitive type, infrared, and a surface acoustic wave, or the touch panel 1742 may be implemented by using any technology to be developed in the future. Further, the touch panel 1742 may cover the display panel 1741. The user may perform, based on content (the displayed content includes but is not limited to a soft keyboard, a virtual mouse, a virtual key, an icon, and the like) displayed on the display panel 1741, an operation on or near the touch panel 1742 covering the display panel 1741. After detecting the operation on or near the touch panel 1742, the touch panel 1742 transfers the operation to the processor 1780 by using the I/O subsystem 1770, to determine user input. Subsequently, the processor 1780 provides corresponding visual output on the display panel 1741 by using the I/O subsystem 1770 based on the user input. Although the touch panel 1742 and the display panel 1741 in FIG. 17 are used as two independent parts to implement input and output functions of the mobile phone 1700, in some embodiments, the touch panel 1742 and the display panel 1741 may be integrated to implement the input and output functions of the mobile phone 1700.

The mobile phone 1700 may further include at least one sensor 1750 such as an optical sensor, a motion sensor, and other sensors. Specifically, the optical sensor may include an ambient light sensor and a proximity sensor. The ambient light sensor may adjust luminance of the display panel 1741 based on brightness of ambient light. The proximity sensor may turn off the display panel 1741 and/or backlight when the mobile phone 1700 moves to an ear. As a type of motion sensor, an accelerometer sensor may detect an acceleration value in each direction (usually on three axes), may detect a value and a direction of gravity when the mobile phone 1700 is stationary, and may be applied to an application for recognizing a mobile phone posture (for example, switching between landscape and portrait screens, a related game, and magnetometer posture calibration), a function related to vibration recognition (for example, a pedometer or a knock), and the like. For the other sensors such as a gyroscope, a barometer, a hygrometer, a thermometer, and an infrared sensor that may also be disposed in the mobile phone 1700.

The audio circuit 1760, a speaker 1761, and a microphone 1762 may provide audio interfaces between the user and the mobile phone 1700. The audio circuit 1760 may convert received audio data into a signal and transmit the signal to the speaker 1761. The speaker 1761 converts the signal into a sound signal for output. In addition, the microphone 1762 converts a collected sound signal into a signal. The audio circuit 1760 receives the signal and converts the signal into audio data, and outputs the audio data to the RF circuit 1710 to send the audio data to, for example, another mobile phone, or outputs the audio data to the storage 1720 for further processing.

The I/O subsystem 1770 is configured to control an external input/output device, and may include the other input device controllers 1771, a sensor controller 1772, and a display controller 1773. Optionally, one or more other input device controllers 1771 receive signals from the other input devices 1730 and/or send signals to the other input devices 1730. The other input devices 1730 may include a physical button (for example, a press button or a rocker button), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the other input device controllers 1771 may be connected to any one or more of the foregoing devices. The display controller 1773 in the I/O subsystem 1770 receives a signal from the screen 1740 and/or sends a signal to the screen 1740. After the screen 1740 detects user input, the display controller 1773 converts the detected user input into interaction with a user interface object displayed on the screen 1740, to implement human-computer interaction. The sensor controller 1772 may receive and/or send signals from/to one or more sensors 1750.

As a control center of the mobile phone 1700, the processor 1780 uses various interfaces and lines to connect all parts of the entire mobile phone, and executes various functions and processes data of the mobile phone 1700 by running or executing software programs and/or modules stored in the storage 1720 and invoking data stored in the storage 1720, to perform overall monitoring on the mobile phone. Optionally, the processor 1780 may include one or more processing units. Preferably, an application processor and a modem processor may be integrated into the processor 1780. The application processor mainly processes an operating system, a user interface, an application program, and the like. The modem processor mainly processes wireless communication. It may be understood that alternatively, the modem processor may not be integrated into the processor 1780.

The mobile phone 1700 further includes the power supply 1790 (for example, a battery) supplying power to the components. Preferably, the power supply may be logically connected to the processor 1780 by using a power management system, to implement functions such as management of charging, discharging, and energy consumption by using the power management system.

Although not shown, the mobile phone 1700 may further include a camera, a Bluetooth module, and the like.

Module division in the embodiment shown in FIG. 17 is an example, is merely logical function division, and may be other division in actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 18:
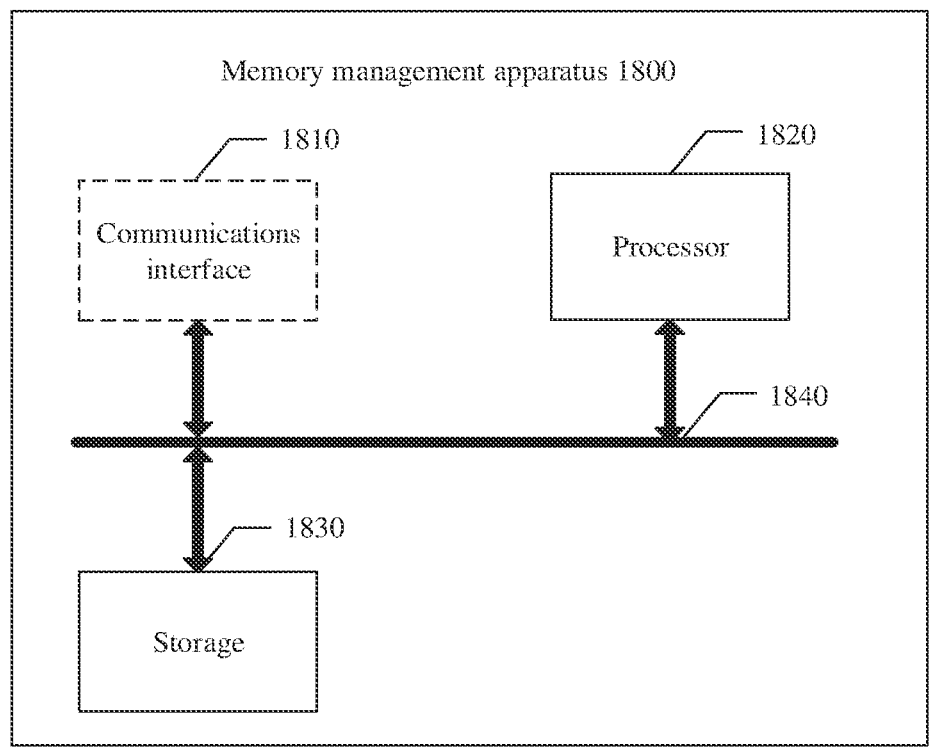
FIG. 18 is another example schematic block diagram of a memory management apparatus according to an embodiment of this application.

FIG. 18 shows a memory management apparatus 1800 according to an embodiment of this application. The memory management apparatus 1800 may be a terminal, and can implement functions of the terminal in the method provided in the embodiments of this application. Alternatively, the memory management apparatus 1800 may be an apparatus that can support a terminal in implementing functions of the terminal in the method provided in the embodiments of this application. The memory management apparatus 1800 may be a chip system. In this embodiment of this application, the chip system may include a chip, or may include a chip and another discrete device.

The memory management apparatus 1800 includes at least one processor 1820, configured to implement or support the memory management apparatus 1800 in implementing functions of a host base station in the method provided in the embodiments of this application. For details, refer to the detailed description in the method example.

The memory management apparatus 1800 may further include at least one storage 1830, configured to store program instructions and/or data. The storage 1830 is coupled to the processor 1820. A coupling in this embodiment of this application is an indirect coupling or communication connection between apparatuses, units, or modules, may be implemented in electrical, mechanical, or other forms, and is used for information exchange between the apparatuses, the units, or the modules. The processor 1820 may operate in cooperation with the storage 1830. The processor 1820 may execute the program instructions stored in the storage 1830. At least one of the at least one storage may be included in the processor 1820.

The memory management apparatus 1800 may further include a communications interface 1810, configured to communicate with another device through a transmission medium, so that an apparatus in the apparatus 1800 can communicate with the another device. For example, the another device may be a terminal. The processor 1820 may send and receive data through the communications interface 1810.

In this embodiment of this application, a specific connection medium between the communications interface 1810, the processor 1820, and the storage 1830 is not limited. In this embodiment of this application, the storage 1830, the processor 1820, and the communications interface 1810 are connected by using a bus 1840 in FIG. 18. The bus is represented by using a bold line in FIG. 18. A manner of connection between other components is merely an example for description, and imposes no limitation. The bus may be classified into an address bus, a data bus, a control bus, and the like. For ease of representation, only one thick line is used to represent the bus in FIG. 18, but this does not mean that there is only one bus or only one type of bus.

In this embodiment of this application, the processor 1820 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps in the methods disclosed with reference to the embodiments of this application may be directly performed and completed by a hardware processor, or may be performed and completed by using a combination of hardware in the processor and a software module.

In this embodiment of this application, the storage 1830 may be a non-volatile memory such as a hard disk drive (HDD) or a solid-state drive (SSD), or may be a volatile memory such as a random access memory (RAM). The storage is any other medium that can carry or store expected program code in a form of an instruction or a data structure and that can be accessed by a computer, but is not limited thereto. The storage in this embodiment of this application may be alternatively a circuit or any other apparatus that can implement a storage function, and is configured to store program instructions and/or data.

An embodiment of this application further provides a computer-readable storage medium including instructions. When the instructions run on a computer, the computer performs the method performed by the computing device in the embodiment shown in FIG. 7 or FIG. 14.

An embodiment of this application further provides a computer program product including instructions. When the computer program product runs on a computer, the computer performs the method performed by the computing device in the embodiment shown in FIG. 7 or FIG. 14.

An embodiment of this application provides a chip system. The chip system includes a processor, may further include a storage, and is configured to implement functions of the computing device in the foregoing method. The chip system may include a chip, or may include a chip and another discrete device.

All or some of the methods provided in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of procedures or functions according to the embodiments of the present technology are generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

A person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A method, comprising:
obtaining, by one or more processors, a hit count of each reference cycle in the first reference cycle, wherein the hit count is used to indicate a quantity of times of reclaiming memory occupied by the plurality of objects in the second reference cycle;
determining, by the one or more processors, a hit rate of each of a plurality of reference cycles, wherein the hit rate is a ratio of the hit count to a quantity of times of performing memory management;
deleting, by the one or more processors, information about the first reference cycle whose hit rate is less than a preset ratio, or setting a status of the information about the first reference cycle whose hit rate is less than the preset ratio to an invalid state;
obtaining, by the one or more processors, stored information about a first reference cycle, wherein the first reference cycle includes a cyclic reference formed by a plurality of objects, and the information about the first reference cycle comprises the plurality of objects in the first reference cycle and a reference relationship between the plurality of objects;
determining, by the one or more processors, that a second reference cycle exists, wherein information about the second reference cycle matches the information about the first reference cycle, and the information about the second reference cycle comprises a plurality of objects in the second reference cycle and a reference relationship between the plurality of objects; and
reclaiming, by the one or more processors, memory occupied by the plurality of objects in the second reference cycle.

2. The method according to claim 1, wherein
the information about the first reference cycle further comprises a reference counting value, in the first reference cycle, of each object in the first reference cycle, and
the information about the second reference cycle further comprises a reference counting value, in the second reference cycle, of each object in the second reference cycle; and
the information about the second reference cycle matching the information about the first reference cycle comprises the plurality of objects in the second reference cycle are in a one-to-one correspondence with the plurality of objects in the first reference cycle and the reference counting value of each object in the second reference cycle is equal to a reference counting value of a corresponding object in the first reference cycle.

3. The method according to claim 1, wherein the information about the first reference cycle comprises an identifier of a referenced object, and the identifier of the referenced object includes a storage address of the referenced object, an offset of a storage address of the referenced object relative to a storage address of a referencing object of the referenced object, or a name of the referenced object.

4. The method according to claim 1, wherein the information about the first reference cycle is stored in metadata of a first object, the first object is a last object in the plurality of objects in the first reference cycle and the last object is released by an external object, and the external object is an object, other than the plurality of objects in the first reference cycle, that references the first object.

5. The method according to claim 1, wherein before obtaining the stored information about the first reference cycle, the method further comprises:
obtaining, by the one or more processors, a plurality of objects generated in a running process of an application program, wherein any one of the plurality of objects is an object whose reference counting value is greater than 0;
determining, by the one or more processors, a reference relationship between the plurality of objects based on information about each of the plurality of objects, wherein the information about each object comprises an identifier of an object referenced by each object; and
generating and storing, by the one or more processors, the information about the first reference cycle based on the reference relationship between the plurality of objects.

6. The method according to claim 1, further comprising:
determining, by the one or more processors, that a reference counting value of any object is less than or equal to a first threshold, and triggering the obtaining the stored information about the first reference cycle, wherein the any object is included in the first reference cycle.

7. The method according to claim 6, wherein the any object is a last object in the plurality of objects in the first reference cycle and the last object is released by an external object, and the external object is an object, other than the plurality of objects in the first reference cycle, that references the first object.

8. A non-transitory computer storage medium having computer-executable instructions that, when executed by a computer of a terminal, cause the terminal to provide execution comprising:
obtaining a hit count of each reference cycle in the first reference cycle, wherein the hit count is used to indicate a quantity of times of reclaiming memory occupied by the plurality of objects in the second reference cycle;
determining a hit rate of each of a plurality of reference cycles, wherein the hit rate is a ratio of the hit count to a quantity of times of performing memory management;
deleting information about the first reference cycle whose hit rate is less than a preset ratio, or setting a status of the information about the first reference cycle whose hit rate is less than the preset ratio to an invalid state;
obtaining stored information about a first reference cycle, wherein the first reference cycle includes a cyclic reference formed by a plurality of objects, and the information about the first reference cycle comprises the plurality of objects in the first reference cycle and a reference relationship between the plurality of objects;
determining that a second reference cycle exists, wherein information about the second reference cycle matches the information about the first reference cycle, and the information about the second reference cycle comprises a plurality of objects in the second reference cycle and a reference relationship between the plurality of objects; and reclaiming memory occupied by the plurality of objects in the second reference cycle.

9. The non-transitory computer readable storage medium according to claim 8, wherein the information about the first reference cycle further comprises a reference counting value, in the first reference cycle, of each object in the first reference cycle, and the information about the second reference cycle further comprises a reference counting value, in the second reference cycle, of each object in the second reference cycle; and the information about the second reference cycle matching the information about the first reference cycle comprises the plurality of objects in the second reference cycle are in a one-to-one correspondence with the plurality of objects in the first reference cycle and the reference counting value of each object in the second reference cycle is equal to a reference counting value of a corresponding object in the first reference cycle.

10. The non-transitory computer readable storage medium according to claim 8, wherein the information about the first reference cycle comprises an identifier of a referenced object, and the identifier of the referenced object includes a storage address of the referenced object, an offset of a storage address of the referenced object relative to a storage address of a referencing object of the referenced object, or a name of the referenced object.

11. The non-transitory computer readable storage medium according to claim 8, wherein the information about the first reference cycle is stored in metadata of a first object, the first object is a last object in the plurality of objects in the first reference cycle and the last object is released by an external object, and the external object is an object, other than the plurality of objects in the first reference cycle, that references the first object.

12. The non-transitory computer readable storage medium according to claim 8, wherein before obtaining the stored information about the first reference cycle, the terminal is further caused to provide execution comprising:

obtaining a plurality of objects generated in a running process of an application program, wherein any one of the plurality of objects is an object whose reference counting value is greater than 0;

determining a reference relationship between the plurality of objects based on information about each of the plurality of objects, wherein the information about each object comprises an identifier of an object referenced by each object; and generating and storing the information about the first reference cycle based on the reference relationship between the plurality of objects.

13. The non-transitory computer readable storage medium according to claim 8, wherein the terminal is further caused to provide execution comprising:

determining that a reference counting value of any object is less than or equal to a first threshold, and triggering the obtaining the stored information about the first reference cycle, wherein the any object is included in the first reference cycle.

14. The non-transitory computer readable storage medium according to claim 8, wherein the any object is a last object in the plurality of objects in the first reference cycle and the last object is released by an external object, and the external object is an object, other than the plurality of objects in the first reference cycle, that references the first object.

15. An apparatus, comprising:

one or more processors; and a memory configured to store computer readable instructions that, when executed by the one or more processors, cause the apparatus to:

obtain a hit count of each of the plurality of reference cycles and a quantity of times of matching by using information about each reference cycle, wherein the hit count is used to indicate a quantity of times of reclaiming an object in the reference cycle based on the information about the reference cycle;

determine a hit rate of each of the plurality of reference cycles, wherein the hit rate is a ratio of the hit count to a quantity of times of performing memory management;

delete information about a reference cycle whose hit rate is less than a preset ratio, or set a status of information about a reference cycle whose hit rate is less than the preset ratio to an invalid state;

obtain stored information about a first reference cycle, wherein the first reference cycle includes a cyclic reference formed by a plurality of objects, and the information about the first reference cycle comprises the plurality of objects in the first reference cycle and a reference relationship between the plurality of objects;

determine that a second reference cycle exists, wherein information about the second reference cycle matches the information about the first reference cycle, and the information about the second reference cycle comprises a plurality of objects in the second reference cycle and a reference relationship between the plurality of objects; and reclaim memory occupied by the plurality of objects in the second reference cycle.

16. The apparatus according to claim 15, wherein the information about the first reference cycle further comprises a reference counting value, in the first reference cycle, of each object in the first reference cycle, and the information about the second reference cycle further comprises a reference counting value, in the second reference cycle, of each object in the second reference cycle; and the information about the second reference cycle matching the information about the first reference cycle comprises the plurality of objects in the second reference cycle are in a one-to-one correspondence with the plurality of objects in the first reference cycle and the reference counting value of each object in the second reference cycle is equal to a reference counting value of a corresponding object in the first reference cycle.

17. The apparatus according to claim 15, wherein the information about the first reference cycle comprises an identifier of a referenced object, and the identifier of the referenced object includes a storage address of the referenced object, an offset of a storage address of the referenced object relative to a storage address of a referencing object of the referenced object, or a name of the referenced object.

18. The apparatus according to claim 15, wherein the information about the first reference cycle is stored in metadata of a first object, the first object is a last object in the plurality of objects in the first reference cycle and the last object is released by an external object, and the external object is an object, other than the plurality of objects in the first reference cycle, that references the first object.

19. The apparatus according to claim 15, wherein the apparatus is further caused to:
   determine that a reference counting value of any object is less than or equal to a first threshold, and trigger the obtaining the stored information about the first reference cycle, wherein the any object is included in the first reference cycle.

20. The apparatus according to claim 15, wherein the any object is a last object in the plurality of objects in the first reference cycle and the last object is released by an external object, and the external object is an object, other than the plurality of objects in the first reference cycle, that references the first object.

* * * * *